United States Patent
Chen et al.

(10) Patent No.: US 9,541,791 B2
(45) Date of Patent: Jan. 10, 2017

(54) DISPLAY DEVICE

(71) Applicant: AU Optronics Corp., Hsin-Chu (TW)

(72) Inventors: Ming-Lung Chen, Hsin-Chu (TW); Kun-Hung Hsieh, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 429 days.

(21) Appl. No.: 14/159,714

(22) Filed: Jan. 21, 2014

(65) Prior Publication Data

US 2015/0085220 A1    Mar. 26, 2015

(30) Foreign Application Priority Data

Sep. 25, 2013    (TW) .............................. 102134621 A

(51) Int. Cl.
    *G02F 1/1335*      (2006.01)

(52) U.S. Cl.
    CPC ................ *G02F 1/133606* (2013.01); *G02F 2001/133607* (2013.01)

(58) Field of Classification Search
    CPC ............... G02F 1/133606; G02F 2001/133607
    USPC ..................................................... 349/56, 57
    See application file for complete search history.

(56) References Cited

U.S. PATENT DOCUMENTS

| | | | | |
|---|---|---|---|---|
| 5,153,481 A | * | 10/1992 | Matsuda ............... | H01J 29/896 313/478 |
| 6,332,690 B1 | * | 12/2001 | Murofushi ........ | G02F 1/133305 349/64 |
| 2009/0015747 A1 | | 1/2009 | Nishizawa et al. | |
| 2009/0122577 A1 | * | 5/2009 | Wu ....................... | G02B 5/0215 362/627 |
| 2011/0085349 A1 | * | 4/2011 | Ye ........................ | G02B 5/0231 362/606 |
| 2015/0116833 A1 | * | 4/2015 | Boyd ................... | G02B 3/0043 359/599 |

FOREIGN PATENT DOCUMENTS

TW      200942869      10/2009

OTHER PUBLICATIONS

Taiwan Intellectual Property Office, "Office Action," Jun. 18, 2015.

* cited by examiner

*Primary Examiner* — Lucy Chien

(74) *Attorney, Agent, or Firm* — WPAT, PC; Justin King

(57) ABSTRACT

A display device includes a flexible display panel, a light module and an optical film. The flexible display panel has a first axis and curving about the first axis as an axis of curvature. The light module is located on one side of the flexible display panel. The optical film is located between the flexible display panel and the light module. The optical film includes a substrate and multiple first strip microstructures. The substrate has a first side and a second side that are opposite to each other. The first side faces the light module while the second side faces the flexible display panel. The first strip microstructures are located on the first side of the substrate, and the first strip microstructures extend along a second axis.

34 Claims, 25 Drawing Sheets

DISPLAY DEVICE

CROSS-REFERENCE TO RELATED APPLICATIONS

This non-provisional application claims priority under 35 U.S.C. §119(a) on Patent Application No(s). 102134621 filed in Taiwan, R.O.C. on Sep. 25, 2013, the entire contents of which are hereby incorporated by reference.

TECHNICAL FIELD

The disclosure relates to a display device, more particularly to a display device with improved luminance and saturation.

BACKGROUND

For better viewing experience, plenty of companies have launched flat large-screen televisions (TVs). However, since the screens of these TVs are flat, the distances between the viewer and different areas of the screen vary from each other, which has a negative impact on users' viewing experience. Thus, some companies have launched curved large-screen TVs. In curved large-screen TVs, the distances between the viewer and different areas of the screen are approximately the same, which leads to better viewing quality. Nonetheless, as thin film transistor liquid crystal display (TFT-LCD) is curved shape, which is also called curved thin film transistor liquid crystal display (CTFT-LCD), the uniformity of luminance and saturation is worsened and this affects viewing quality negatively. Therefore, it is important to improve the uniformity of luminance and saturation of the CTFT-LCD.

SUMMARY

A display device comprises a flexible display panel, a light module and an optical film. The flexible display panel has a first axis and curving about the first axis as an axis of curvature. The light module is located on one side of the flexible display panel. The optical film is located between the flexible display panel and the light module. The optical film comprises a substrate and a plurality of first strip microstructures. The substrate has a first side and a second side that are opposite to each other. The first side faces the light module while the second side faces the flexible display panel. The first strip microstructures are located on the first side of the substrate. The first strip microstructures extend along a second axis. Besides, a first angle is formed between the first axis and the second axis, and the first angle is greater than or equal to minus 15 degrees and less than or equal to 15 degrees.

A display device comprises a flexible display panel, a light module and an optical film. The flexible display panel has a first axis and curving about the first axis as an axis of curvature. The light module is located on one side of the flexible display panel. The optical film is located between the flexible display panel and the light module. The optical film comprises a substrate, a plurality of first strip microstructures and a plurality of second strip microstructures. The substrate has a first side and a second side that are opposite to each other. The first side faces the light module while the second side faces the flexible display panel. The first strip microstructures are located on the first side of the substrate. The first strip microstructures extend along a second axis. The second strip microstructures are located on the second side of the substrate. In addition, a first angle is formed between the first axis and the second axis, and the first angle is greater than or equal to minus 20 degrees and less than or equal to 20 degrees.

A display device comprises a flexible display panel, a light module and an optical film. The flexible display panel has a first axis and curving about the first axis as an axis of curvature. The light module is located on one side of the flexible display panel. The optical film is located between the flexible display panel and the light module. The optical film comprises a substrate and a plurality of first strip microstructures. The substrate has a first side and a second side that are opposite to each other. The first side faces the light module while the second side faces the flexible display panel. The first strip microstructures are located on the first side of the substrate, in which the first strip microstructures extend along a second axis. Besides, a first direction perpendicular to the first axis is defined, a second direction parallel to the first axis is defined, the angle of full width at half maximum of the display device along the first direction (FWHM1) is greater than 140 degrees, the angle of full width at half maximum of the display device along the second direction (FWHM2) is less than 100 degrees, and the difference between FWHM1 and FWHM2 is greater than 50 degrees.

A display device comprises a flexible display panel, a light module and an optical film. The flexible display panel has a first axis and curving about the first axis as an axis of curvature. The light module is located on one side of the flexible display panel. The optical film is located between the flexible display panel and the light module. The optical film comprises a substrate, a plurality of first strip microstructures and a plurality of pyramidal microstructures. The substrate has a first side and a second side that are opposite to each other, in which the first side faces the light module while the second side faces the flexible display panel. The first strip microstructures are located on the first side of the substrate, in which the first strip microstructures extend along a second axis. The pyramidal microstructures are located on the first side of the substrate, in which the pyramidal microstructures are arranged in an array along a first alignment direction and a second assignment direction intersecting with the first alignment direction. Furthermore, the angle between the first alignment direction and the first axis, the angle between the first alignment direction and the second axis, the angle between the second alignment direction and the first axis, and the angle between the second alignment direction and the second axis are all greater than or equal to 40 degrees and less than or equal to 50 degrees.

A display device comprises a flexible display panel, a light module and an optical film. The flexible display panel has a first axis and curving about the first axis as an axis of curvature. The light module is located on one side of the flexible display panel. The optical film is located between the flexible display panel and the light module. The optical film comprises a substrate, a plurality of first strip microstructures and a plurality of pyramidal microstructures. The substrate has a first side and a second side that are opposite to each other, in which the first side faces the light module while the second side faces the flexible display panel. The first strip microstructures are located on the first side of the substrate, in which the first strip microstructures extend along a second axis. The pyramidal microstructures located on the second side of the substrate and arranged in an array. Furthermore, a first direction perpendicular to the first axis is defined, a second direction parallel to the first axis is defined, a third direction forming a 45 degree angle between itself and the first direction is defined, a fourth direction forming a 45 degree angle between itself and the second direction is defined, the fourth direction is perpendicular to the third direction, both the angle of full width at half maximum of the display device along the first direction (hereinafter (FWHM1) and the angle of full width at half maximum of the display device along the second direction (hereinafter (FWHM2) are greater than 140 degrees, both the angle of full width at half maximum of the display device along the third direction (hereinafter (FWHM3) and the angle of full width at half maximum of the display device along the fourth direction (hereinafter (FWHM4) are less than 125 degrees, and the difference between FWHM1 and FWHM3 , the difference between FWHM1 and FWHM4 , the difference between FWHM2 and FWHM3 , and the difference between FWHM2 and FWHM4 are all greater than 40 degrees.

A display device comprises a flexible display, a light module and an optical film. The flexible display panel curves as a spherical shape. The light module is located on one side of the flexible display panel. The optical film is located between the flexible display panel and the light module, in which the optical film comprises a substrate having a plurality of microcavities, and the light transmittance of the substrate ranges from 5% to 50%.

A display device comprises a flexible display panel, a light module and an optical film. The flexible display panel curves as a spherical shape. The light module is located on one side of the flexible display panel. The optical film has a plurality of microcavities, in which the angles of full width at half maximum of the display device along any direction are greater than 140 degrees.

BRIEF DESCRIPTION OF THE DRAWINGS

The disclosure will become more fully understood from the detailed description given herein below and the drawings are for illustration only, and thus do not limit the present disclosure, wherein.

DETAILED DESCRIPTION

Figure 1:
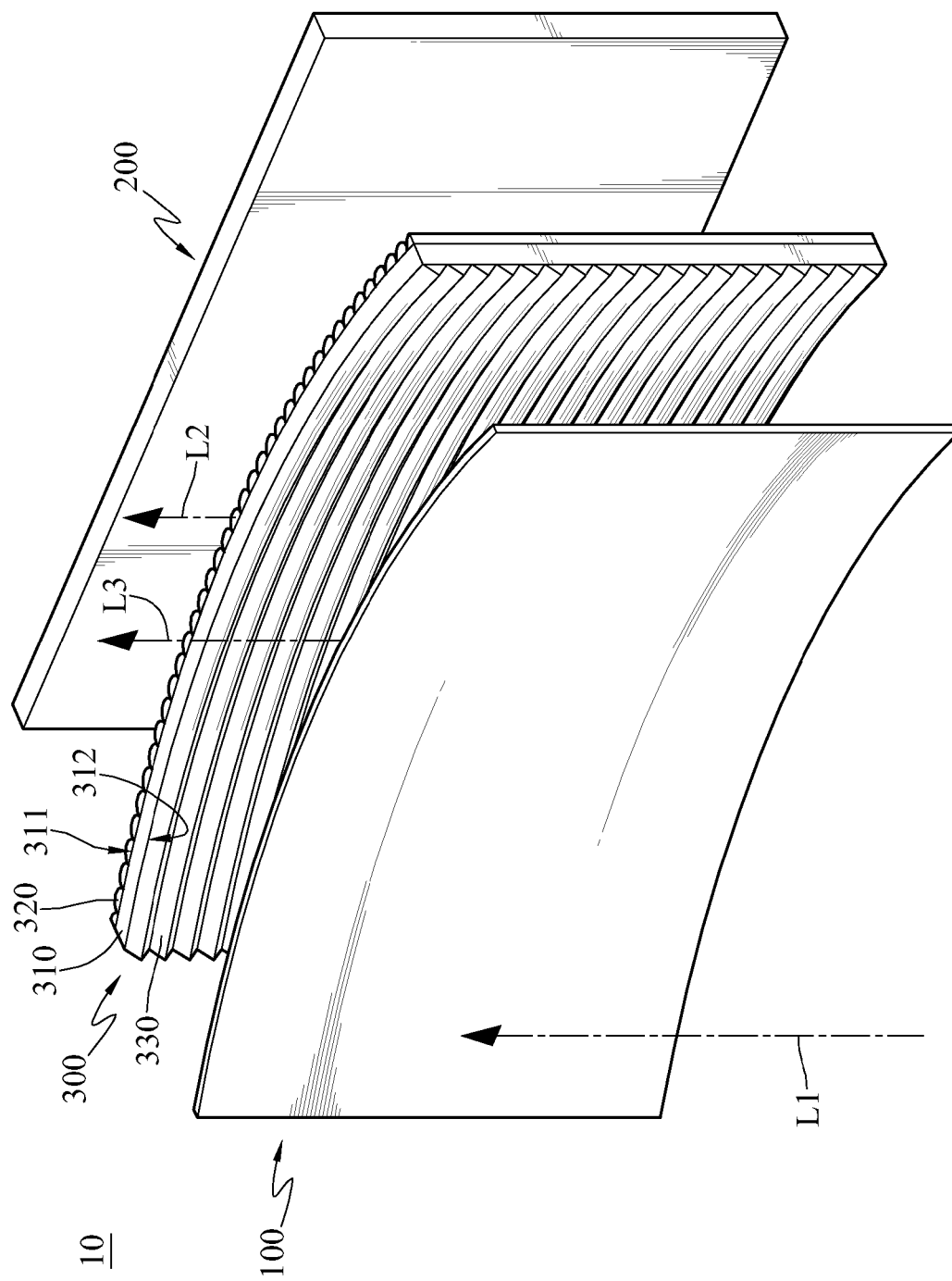
FIG. 1 is an exploded view of the display device according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
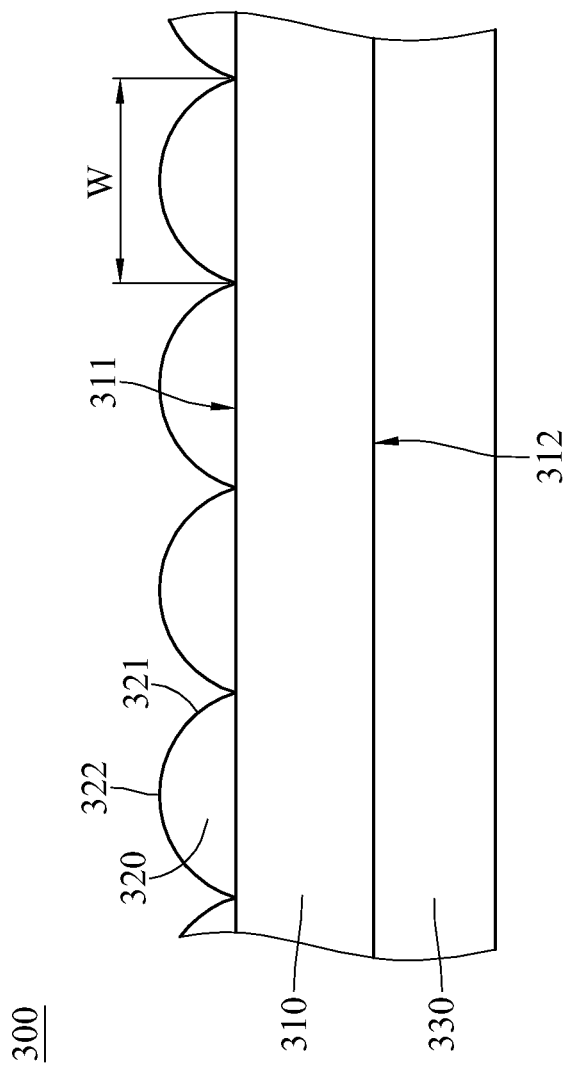
FIG. 2 is a side view of the optical film of FIG. 1.

FIG. 1 is an exploded view of the display device according to the first embodiment of the disclosure. FIG. 2 is a front view of the optical film of FIG. 1. As seen in FIG. 1 and FIG. 2, the display device 10 of this embodiment comprises a flexible display panel 100, a light module 200 and an optical film 300. The flexible display panel 100 has a first axis L1, and curves about the first axis L1 as the axis of curvature. The light module 200 is located at one side of the flexible display panel 100.

The optical film 300 is located between the flexible display panel 100 and the light module 200 and comprises a substrate 310, a plurality of first strip microstructures 320 and a plurality of second strip microstructures 330.

The substrate 310 curves about the first axis L1 as the axis of curvature, therefore becoming the curved substrate 310. The substrate 310 has a first side 311 and a second side 312 opposite to each other. The first side 311 faces the light module 200, while the second side 312 faces the flexible display panel 100.

These first strip microstructures 320 are located on the first side 311 of the substrate 310 and extend along a second axis L2. A first angle is formed between the first axis L1 and the second axis L2. In this embodiment, the first angle is 0 degree, namely the first axis L1 is parallel to the second axis L2, but the disclosure is not limited thereto. In other embodiments, the first angle can be greater than or equal to minus 20 degrees to less than or equal to 20 degrees. A positive angle of the first angle refers to an angle measured by a counterclockwise direction based on the first axis L1. A negative angle of the first angle refers to an angle measured by a clockwise direction based on the first axis L1.

In this embodiment, the widths of these first strip microstructures 320 are greater than or equal to 10 μm to less than or equal to 100 μm. Specifically, each of the first strip microstructures 320 has two lateral sides 321 opposite to each other and connected to the first side 311. The two lateral sides 321 are curved surfaces, and the maximum distance between them is greater than or equal to 10 μm and less than or equal to 100 μm. In this embodiment, the widths of the first strip microstructures 320 are the same but this is not intended to limit the disclosure. In other embodiments, the widths of the first strip microstructures 320 may be different from each other, as long as the first strip microstructures 320 extend along the second axis L2.

In this embodiment, an end 322 of each of the first strip microstructures 320, away from the substrate 310, has a rounded structure. The radius of curvature of the rounded structure is greater than or equal to 5 μm and less than or equal to 80 μm.

The second strip microstructures 330 are located on the second side 312 of the substrate 310. Theses second strip microstructures 330 curves about a third axis L3 as the axis of curvature, and a second angle is formed between the first axis L1 and the third axis L3. In this embodiment, the second angle is 0 degree, namely the first axis L1 is parallel to the third axis L3, but the disclosure is not limited thereto. In other embodiments, the second angle can be greater than or equal to minus 20 degrees and less than or equal to 20 degrees. A positive angle of the second angle refers to an angle measured by a counterclockwise direction based on the first axis L1. A negative angle of the second angle refers to an angle measured by a clockwise direction based on the first axis L1.

The widths of the second strip microstructures 330 are greater than or equal to 10 μm and less than or equal to 100 μm. Each of the second strip microstructures 330 has two lateral sides 321 opposite to each other and connected to the second side 312 of the substrate 310. The two lateral sides 321 are planes, and the maximum distance between them are greater than or equal to 10 μm and less than or equal to 100 μm.

In other embodiments, the surfaces of the first strip microstructures 320 and the second strip microstructures 330 may have a plurality of sub-microstructures. The sub-microstructures may be a convex structure, small bumps or small pores.

The optical effects of the display device 10 are illustrated as follows. Firstly, a first direction perpendicular to the first axis L1 is provided, and a second direction parallel to the first axis L1 is provided. Then, due to the relationship among the flexible display panel 100, the first strip microstructures 320 and the second strip microstructures 330, the display device 10 meet the following conditions: Condition 1, the angle of full width at half maximum of the display device 10 along the first direction (hereinafter (FWHM1) is greater than 140 degrees. Condition 2, the angle of full width at half maximum of the display device 10 along the second direction (hereinafter (FWHM2) is less than 100 degrees. Condition 3, the difference between FWHM1 and FWHM2 is greater than 50 degrees. When the display device 10 satisfies the above three conditions, the uniform of the luminance and the saturation of the display device 10 is improved. Moreover, FWHM refers to the viewing range with luminance greater than 50 percent in the graph of luminance with different viewing angles.

Figures 3A, 3B:
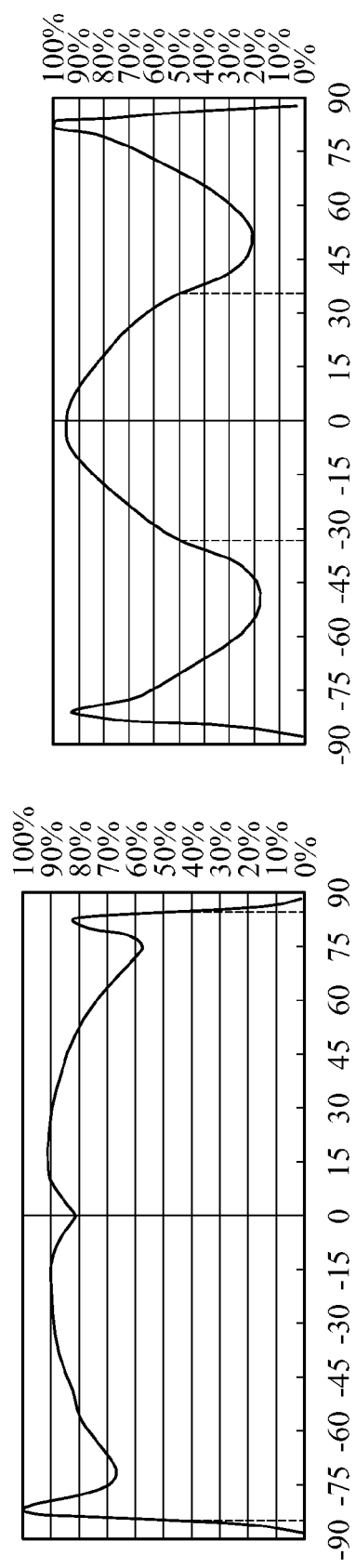
FIG. 3A and FIG. 3B are graphs of luminance with different viewing angles when the first angle is 0 degree and the second angle is 0 degree of FIG. 1
Figure 4B:
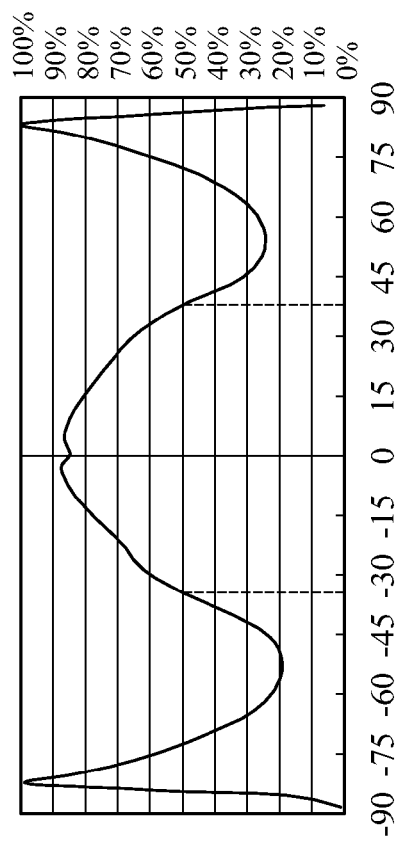
FIG. 4A and FIG. 4B are graphs of luminance with different viewing angles according to the second embodiment of the disclosure.
Figure 4A:
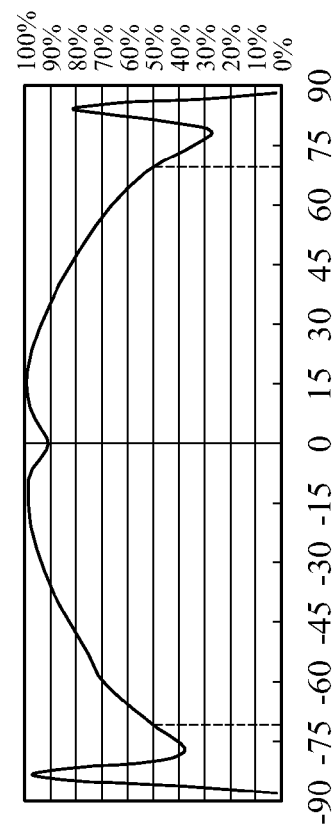
Figures 5A, 5B:
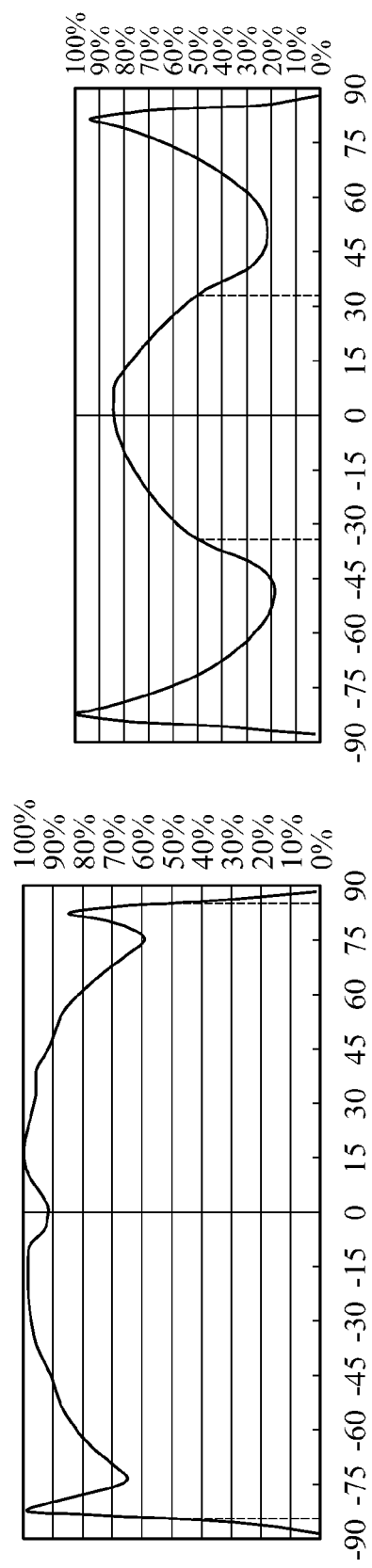
FIG. 5A and FIG. 5B are graphs of luminance with different viewing angles according to the third embodiment of the disclosure.

FIG. 3A and FIG. 3B are graphs of luminance with different viewing angles when the first angle is 0 degree and the second angle is 0 degree of FIG. 1; FIG. 4A and FIG. 4B are graphs of luminance with different viewing angles according to the second embodiment of the disclosure; FIG. 5A and FIG. 5B are graphs of luminance with different viewing angles according to the third embodiment of the disclosure. As seen in FIG. 3A to FIG. 3B, FWHM1 of the display device 10 measured along the first direction from the first angle being 0 degree and from the second angle being 0 degree is about 170 degrees (greater than 140 degrees). In addition, FWHM2 along the second direction is about 75 degrees (less than 100 degrees), and the difference between FWHM 1 and FWHM 2 is about 95 degrees (greater than 50 degrees).

As seen in FIG. 4A to FIG. 4B, FWHM 1 of the display device 10 measured along the first direction from the first angle being minus 20 degrees and from the second angle being minus 20 degrees is about 142 degrees (greater than 140 degrees). FWHM2 along the second direction is about 72 degrees (less than 100 degrees), and the difference between FWHM 1 and FWHM 2 is about 70 degrees (greater than 50 degrees).

As seen in FIG. 5A to FIG. 5B, FWHM 1 of the display device 10 measured along the first direction from the first angle being greater than or equal to minus 20 degrees and less than or equal to 20 degrees and from the second angle being greater than or equal to minus 20 degrees and less than or equal to 20 degrees is about 175 degrees (greater than 140 degrees). FWHM 2 along the second direction is about 65 degrees (less than 100 degrees), and the difference between FWHM 1 and FWHM 2 is about 110 degrees (greater than 50 degrees).

As seen in FIG. 3A to FIG. 5B, the display device 10 with the first angle being greater than or equal to minus 20 degrees and less than or equal to 20 degrees and the second angle being greater than or equal to minus 20 degrees and less than or equal to 20 degrees can meet the following conditions: 1. the angle of full width at half maximum of the display device 10 along the first direction (FWHM1) is greater than 140 degrees. 2. The angle of full width at half maximum of the display device 10 along the second direction (FWHM2) is less than 100 degrees. 3. The difference between FWHM1 and FWHM2 is greater than 50 degrees. When these conditions are met, the uniform of the luminance and the saturation of the display device 10 is improved.

Figure 6:
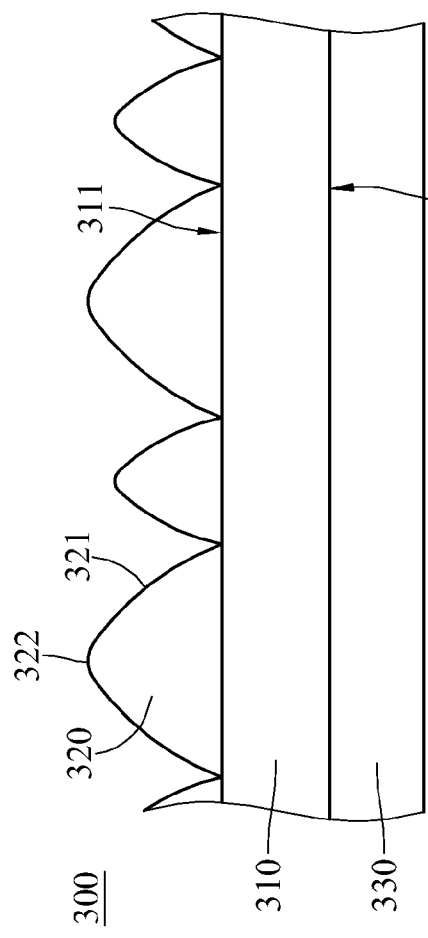
FIG. 6 is a side view of the optical film according to the fourth embodiment of the disclosure.
Figure 7:
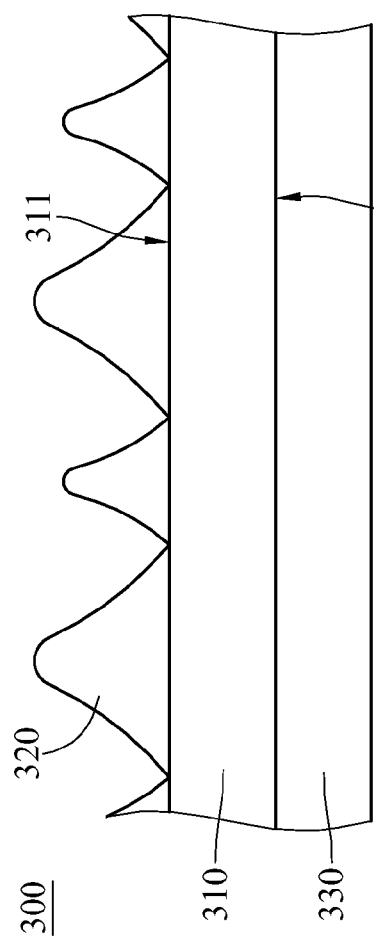
FIG. 7 is a side view of the optical film according to the fifth embodiment of the disclosure.
Figure 8:
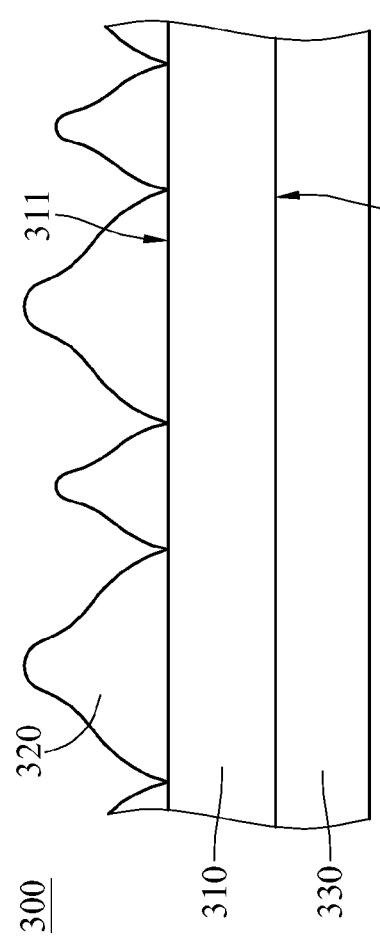
FIG. 8 is a side view of the optical film according to the sixth embodiment of the disclosure.
Figure 9:
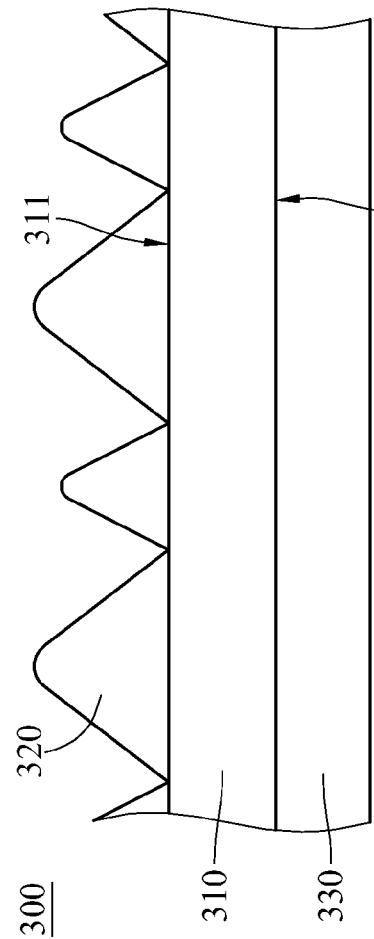
FIG. 9 is a side view of the optical film according to the seventh embodiment of the disclosure.

Though the widths of the aforementioned first strip microstructures 320 are the same and the two lateral sides 321 are curved, they are not limited thereto. In other embodiments, the two lateral sides 321 of the first strip microstructures 320 can be other geometry. Referring to FIG. 6 to FIG. 10, FIG. 6 is a side view of the optical film according to the fourth embodiment of the disclosure; FIG. 7 is a side view of the optical film according to the fifth embodiment of the disclosure; FIG. 8 is a side view of the optical film according to the sixth embodiment of the disclosure; FIG. 9 is a side view of the optical film according to the seventh embodiment of the disclosure. The embodiments shown by these figures are similar to the embodiment of FIG. 1 so only the differences are illustrated. As seen in FIG. 6, in this embodiment, the two lateral sides of each of the first strip microstructures 320 are curved (namely, in curved shapes), and are bulging outward. Additionally, at least two first strip microstructures 320 have different widths. As seen in FIG. 7, in this embodiment, the two lateral sides of each of the first strip microstructures 320 are curved (namely in curved shapes), and are curving in. Besides, at least two first strip microstructures 320 have different widths. As seen in FIG. 8, in this embodiment, the two lateral sides of each of the first strip microstructures 320 are curved (namely in curved shapes), and the cross section thereof are in S-shape. At least two first strip microstructures 320 have different widths. As seen in FIG. 9, in this embodiment, the two lateral sides of each of the first strip microstructures 320 are flat, and at least two first strip microstructures 320 have different widths.

Figure 10:
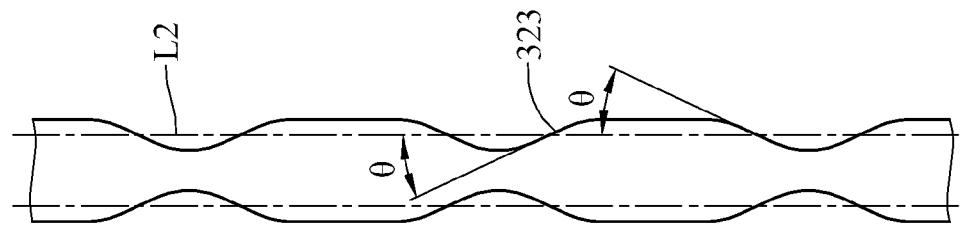
FIG. 10 is a schematic view of the optical film according to the eighth embodiment of the disclosure.

FIG. 10 is a schematic view of the optical film according to the eighth embodiment of the disclosure. The embodiment shown in FIG. 10 is similar to the embodiment of FIG. 1 so only the differences will be illustrated. As shown in FIG. 10, in this embodiment, at least one first strip microstructure 320 has a curved surface 323, and the angle θ formed by the curved surface 323 and the second axis L2 is greater than 0 degree and less than or equal to 30 degrees.

Figure 11:
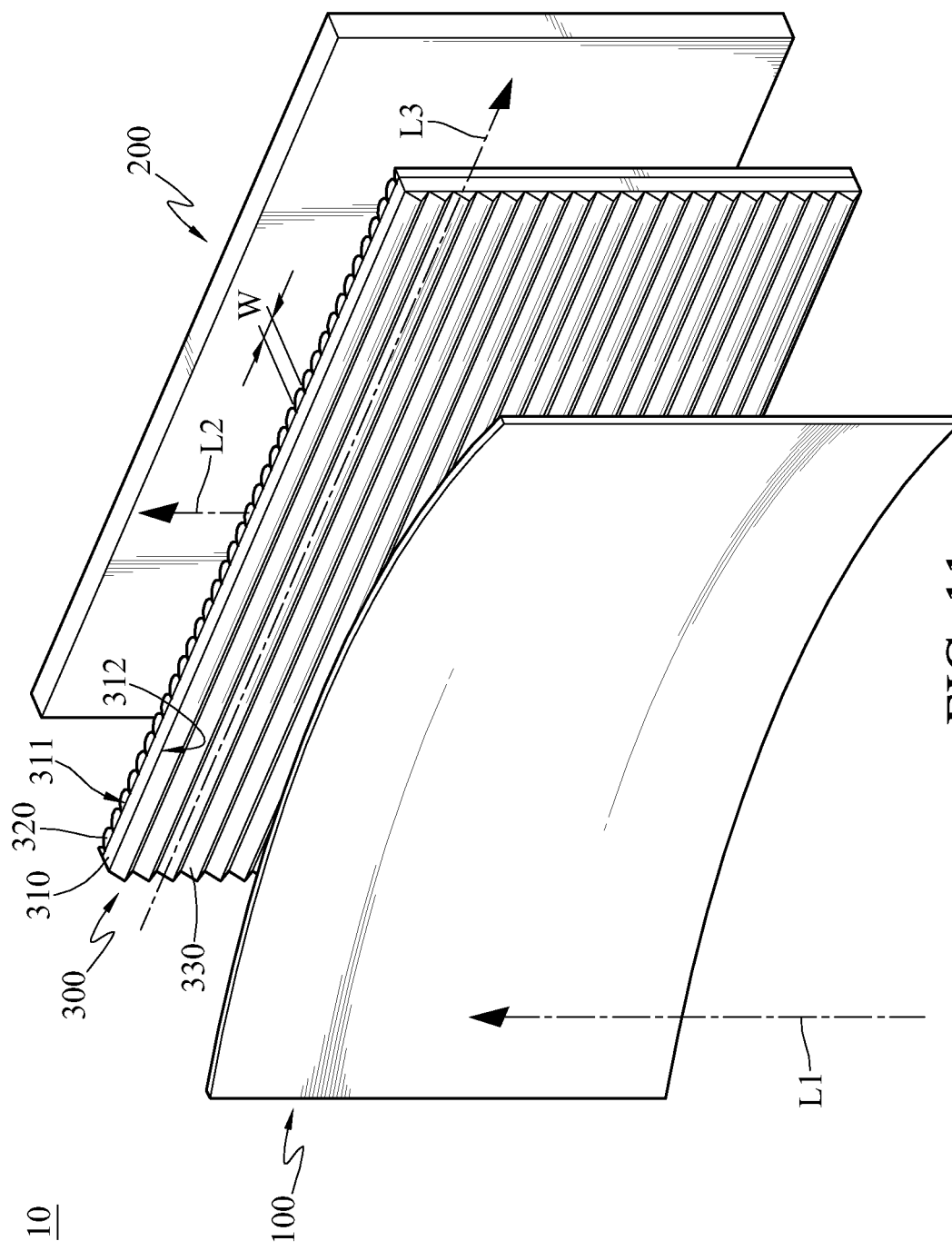
FIG. 11 is an exploded view of the optical film according to the ninth embodiment of the disclosure.

FIG. 11 is an exploded view of the optical film according to the ninth embodiment of the disclosure. The embodiment shown in FIG. 11 is similar to the embodiment of FIG. 1 so only the differences will be illustrated. As shown in FIG. 11, the substrate 310 of this embodiment is a plate and has a first side 311 and a second side 312 opposite to each other. The first side 311 faces the light module 200, while the second side 312 faces the flexible display panel 100.

In this embodiment, these first strip microstructures 320 are on the first side 311 of the substrate 310 and extend along a second axis L2. A first angle is formed between the first axis L1 and the second axis L2. In this embodiment, the first angle is 0 degree but the disclosure is not limited thereto. In other embodiments, the first angle can be greater than or equal to minus 20 degrees and less than or equal to 20 degrees. A positive angle of the first angle refers to an angle measured by a counterclockwise direction based on the first axis L1.

A negative angle of the first angle refers to an angle measured by a clockwise direction based on the first axis L1.

The second strip microstructures 330 are on the second side 312 of the substrate 310. These second strip microstructures 330 extend along a third axis L3, and a second angle is formed by the first axis L1 and the third axis L3. In this embodiment, the second angle is 90 degrees but it is not limited thereto. In other embodiments, the second angle may be greater than or equal to 70 degrees and less than or equal to 110 degrees.

The graph of luminance from different viewing angles regarding the display device 10 with flat substrate 310 is the same as that of the display device 10 with curved substrate 310, so the repeated is not explained herein again.

Figure 12:
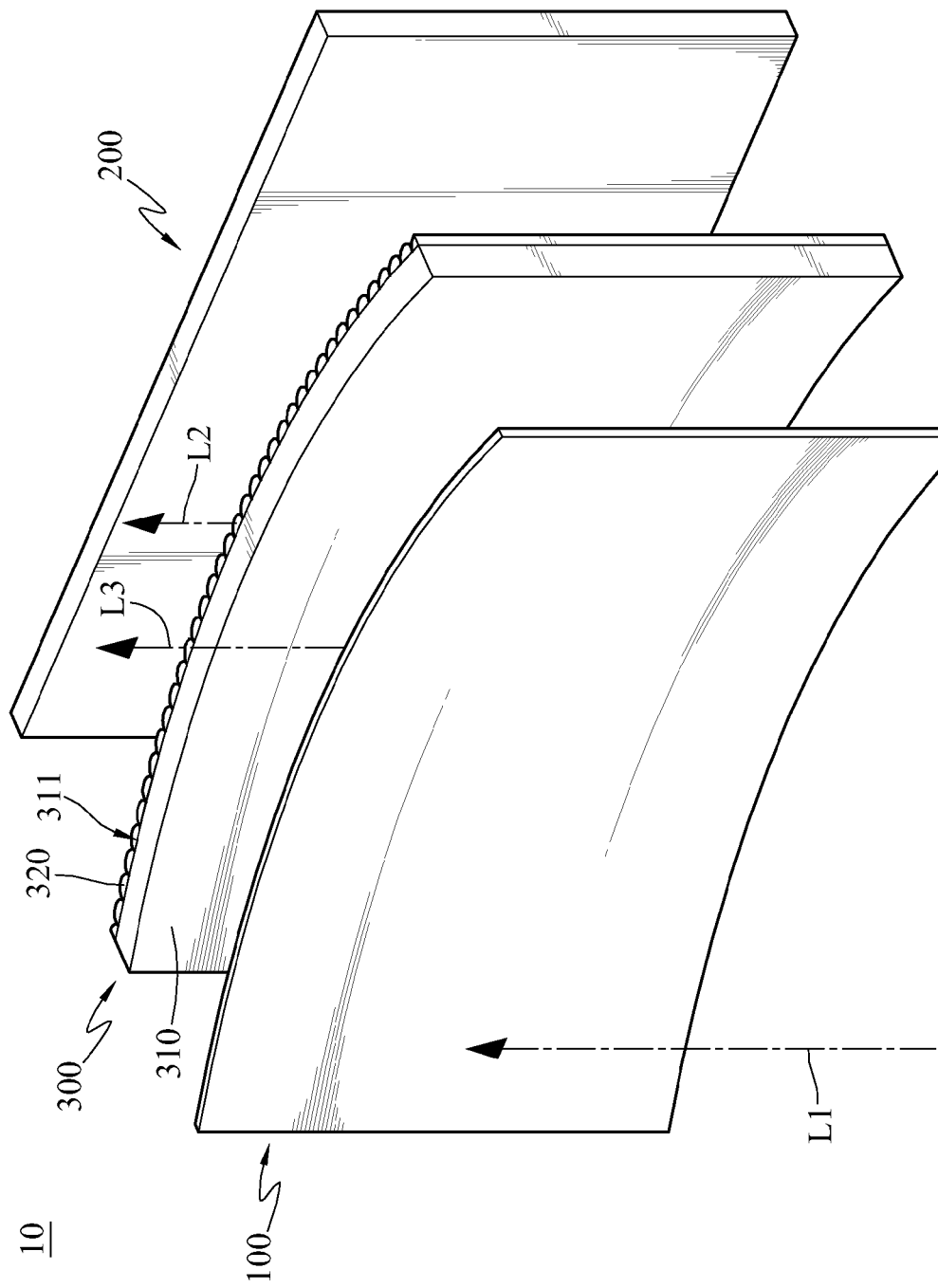
FIG. 12 is an exploded view of the optical film according to the tenth embodiment of the disclosure.
Figure 13:
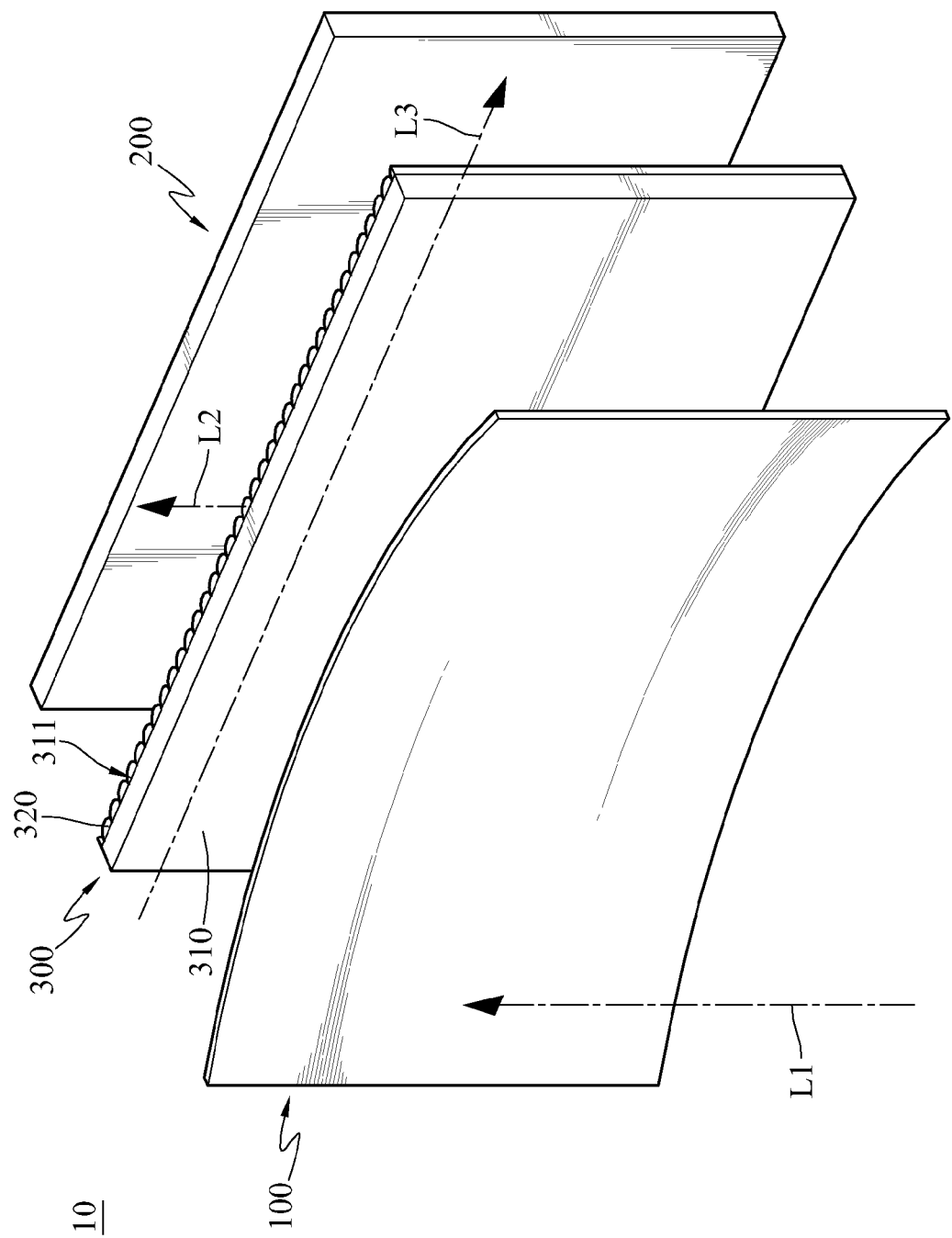
FIG. 13 is an exploded view of the optical film according to the eleventh embodiment of the disclosure.

FIG. 12 is an exploded view of the optical film according to the tenth embodiment of the disclosure; FIG. 13 is an exploded view of the optical film according to the eleventh embodiment of the disclosure. The embodiments shown by these figures are similar to the embodiment of FIG. 1 so only the differences will be illustrated. As seen in FIG. 12, the second side 312 of the optical film 300 does not have the second strip microstructures 330, which is different from the embodiment of FIG. 1. That is, substrate 310 curves about the first axis L1 as the axis of curvature, therefore becoming a curved substrate 310. These first strip microstructures 320 extend along a second axis L2. The second side 312 of the optical film 300 is a smooth surface. In this embodiment, a first angle is formed by the first axis L1 and the second axis L2. In this embodiment, the first angle is 0 degrees but it is not limited thereto. In other embodiments, the second angle may be greater than or equal to minus 15 degrees and less than or equal to 15 degrees. A positive angle of the first angle refers to an angle measured by a counterclockwise direction based on the first axis L1. A negative angle of the first angle refers to an angle measured by a clockwise direction based on the first axis L1.

As seen in FIG. 13, the substrate 310 of this embodiment is a plate, which is different from the tenth embodiment.

Figure 14B:
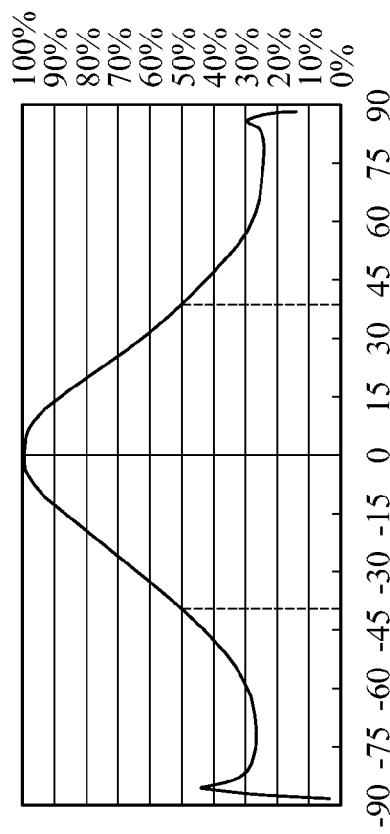
FIG. 14A and FIG. 14B are graphs of luminance with different viewing angles of FIG. 2 when the first angle is 0 degree.
Figure 14A:
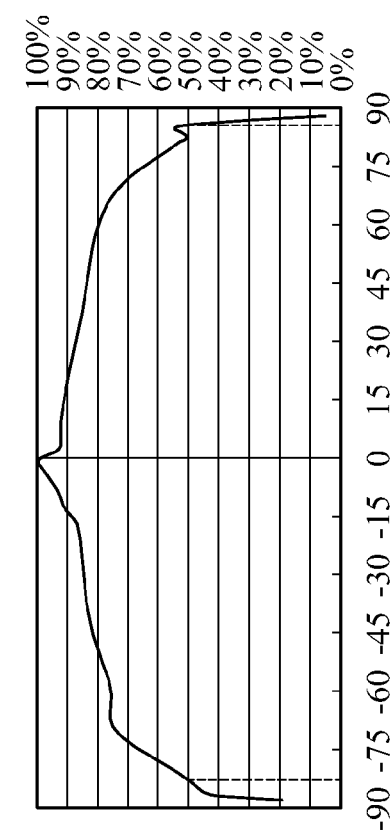
Figure 15B:
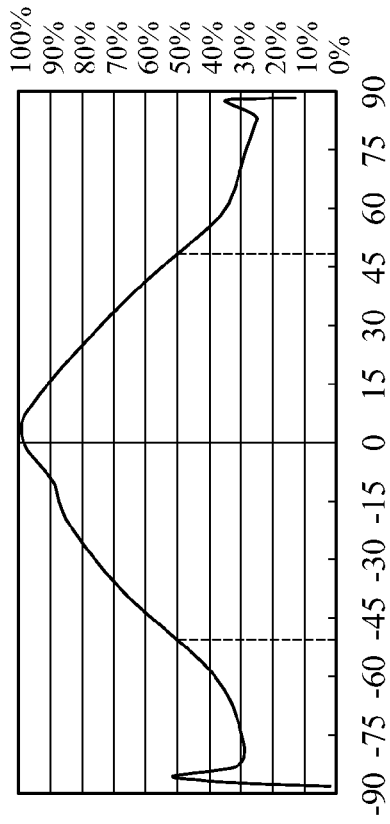
FIG. 15A and FIG. 15B are graphs of luminance with different viewing angles according to the twelfth embodiment of the disclosure.
Figure 15A:
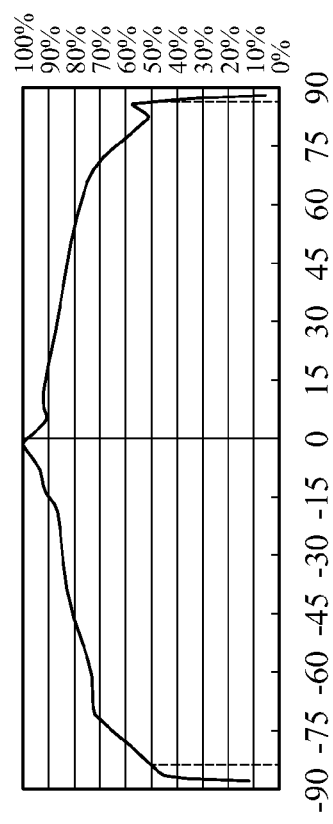
Figure 16B:
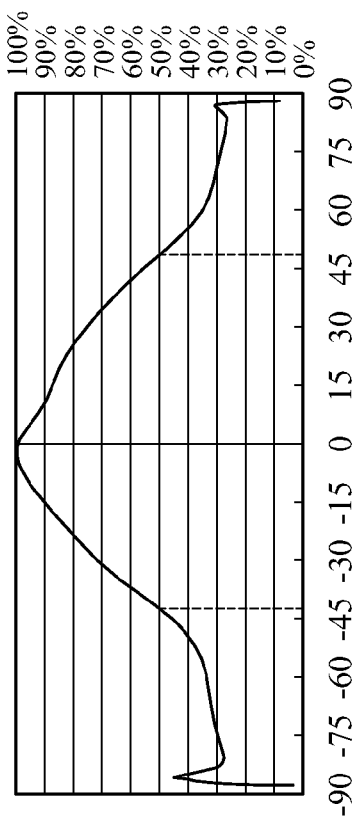
FIG. 16A and FIG. 16B are graphs of luminance with different viewing angles according to the thirteenth embodiment of the disclosure.
Figure 16A:
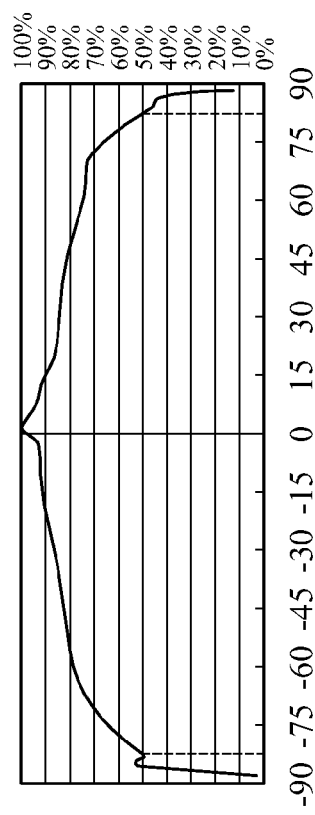

FIG. 14A and FIG. 14B are graphs of luminance with different viewing angles of FIG. 2 when the first angle is 0 degree; FIG. 15A and FIG. 15B are graphs of luminance with different viewing angles according to the twelfth embodiment of the disclosure; FIG. 16A and FIG. 16B are graphs of luminance with different viewing angles according to the thirteenth embodiment of the disclosure. As seen in FIG. 14A and FIG. 14B, FWHM1 of the display device 10 measured along the first direction from the first angle being 0 degree is about 170 degrees (greater than 140 degrees). FWHM 2 along the second direction is about 80 degrees (less than 100 degrees), and the difference between FWHM 1 and FWHM 2 is about 90 degrees (greater than 50 degrees).

As seen in FIG. 15A and FIG. 15B, in this embodiment, FWHM 1 of the display device 10 measured along the first direction from the first angle being 15 degree is about 165 degrees (greater than 140 degrees). FWHM 2 along the second direction is about 95 degrees (less than 100 degrees), and the difference between FWHM 1 and FWHM 2 is about 70 degrees (greater than 50 degrees).

As seen in FIG. 16A and FIG. 16B, in this embodiment, FWHM 1 of the display device 10 measured along the first direction from the first angle being minus 15 degree is about 160 degrees (greater than 140 degrees). FWHM2 along the second direction is about 90 degrees (less than 100 degrees), and the difference between FWHM 1 and FWHM 2 is about 70 degrees (greater than 50 degrees).

As seen in FIG. 14A to FIG. 16B, the display device 10 with the first angle being greater than or equal to minus 15 degrees and less than or equal to 15 degrees can meet the following condition: 1. the angle of full width at half maximum of the display device 10 along the first direction (FWHM1) is greater than 140 degrees. 2. The angle of full width at half maximum of the display device 10 along the second direction (FWHM2) is less than 100 degrees. 3. The difference between FWHM1 and FWHM2 is greater than 50 degrees. When these conditions are met, the uniform of the luminance and the saturation of the display device 10 is improved.

The graph of luminance from different viewing angles regarding the display device 10 with curved substrate 310 is the same as that of the display device 10 with flat substrate 310, so only the graph of luminance from different viewing angles regarding the display device 10 with curved substrate 310 is provided.

Figure 17:
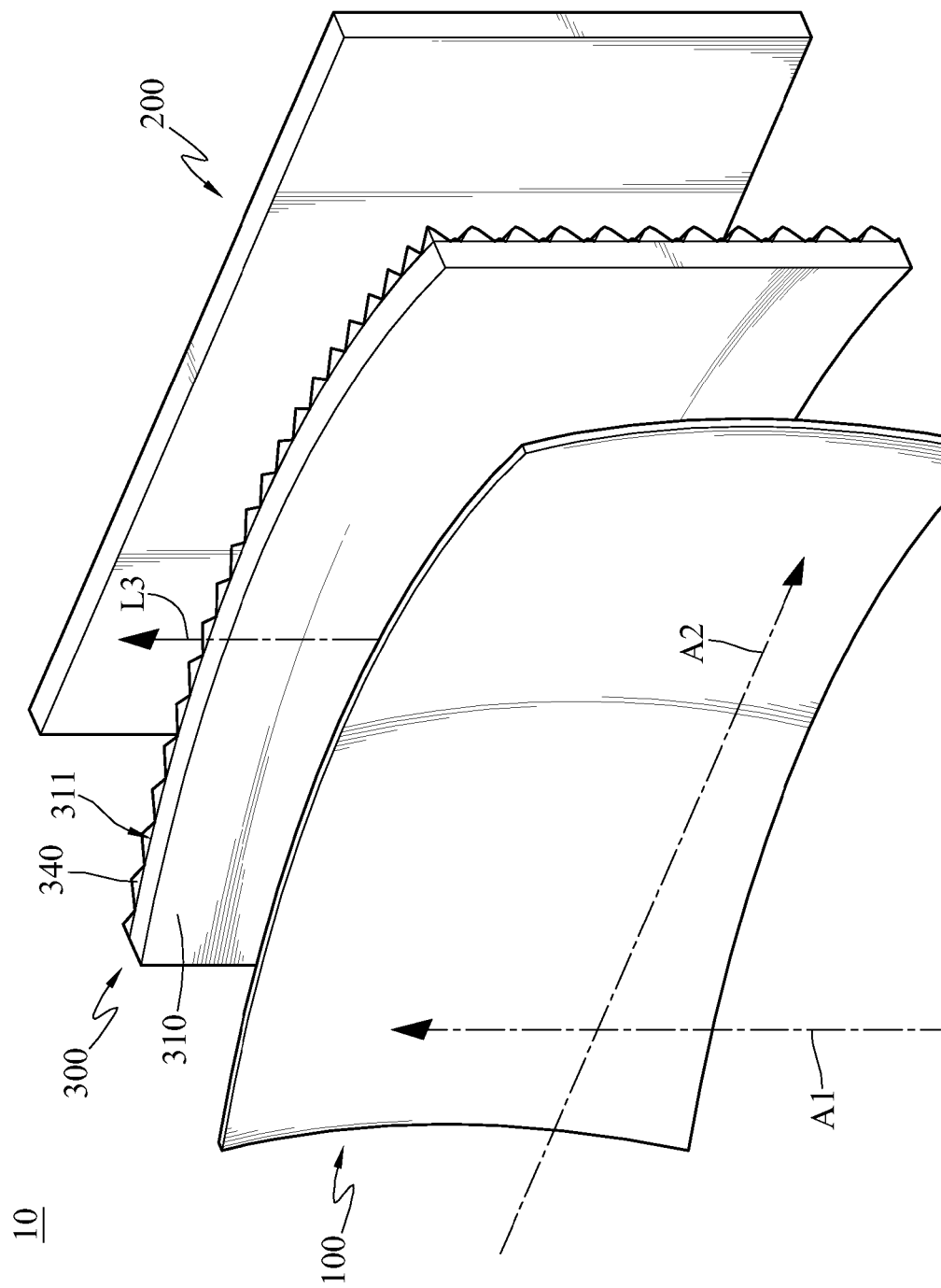
FIG. 17 is an exploded view of the display device according to the fourteenth embodiment of the disclosure.
Figure 18:
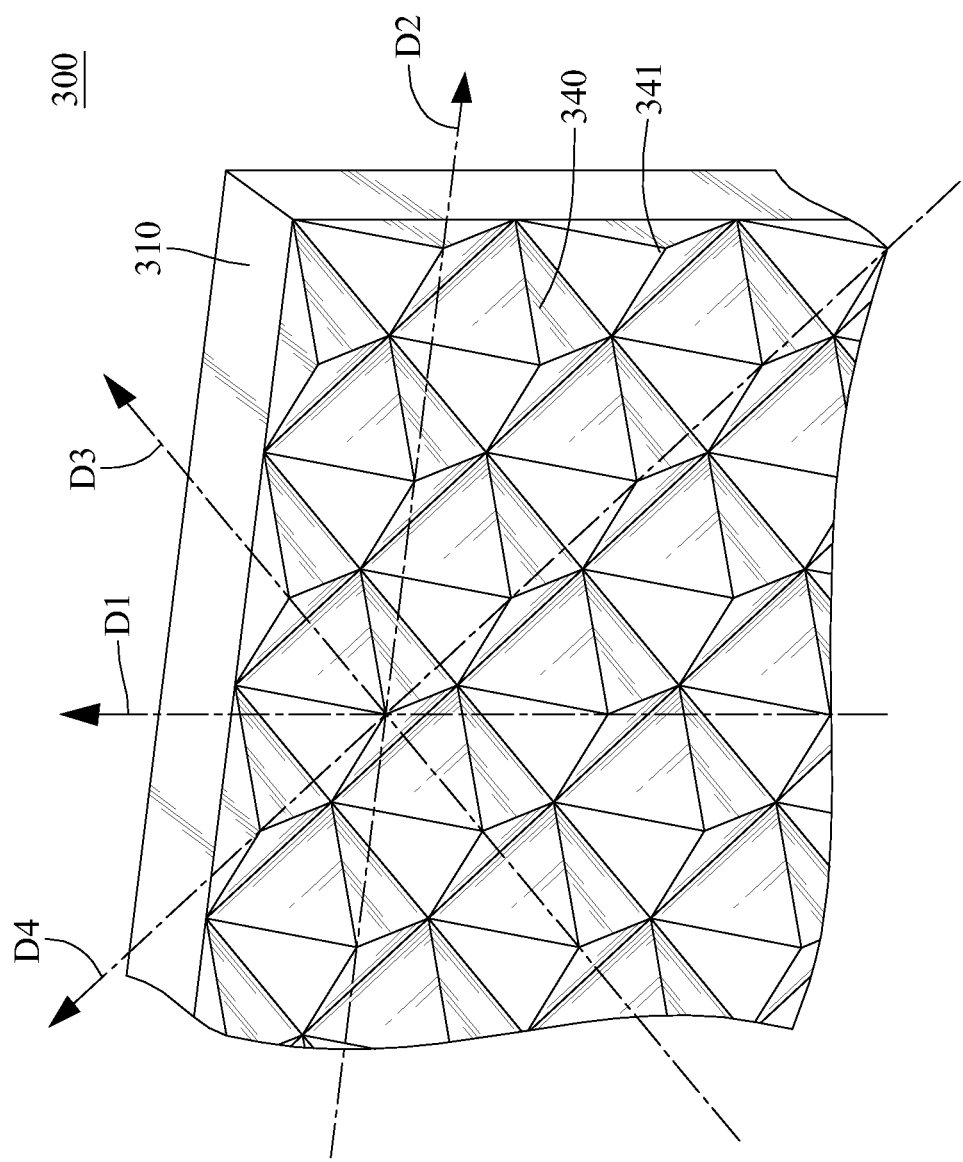
FIG. 18 is a perspective view of the optical film of FIG. 17.
Figure 19A:
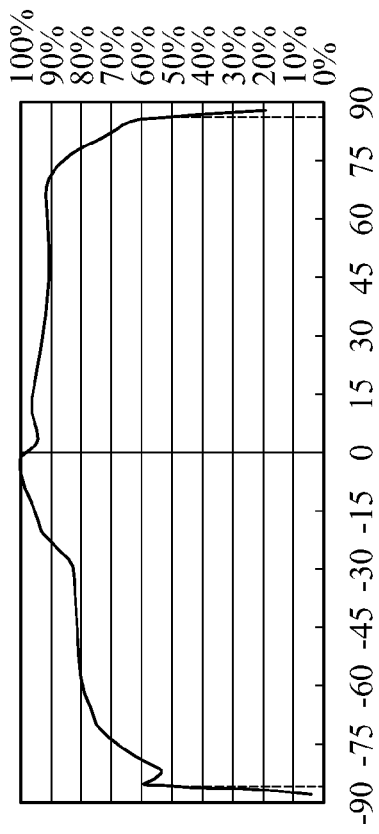
FIG. 19A to FIG. 19D are graphs of luminance with different viewing angles of FIG. 17 when the angle between the first alignment direction and the first axis, the angle between the first alignment direction and the second axis, the angle between the second alignment direction and the first axis, and the angle between the second alignment direction and the second axis are all 45 degrees.
Figure 19B:
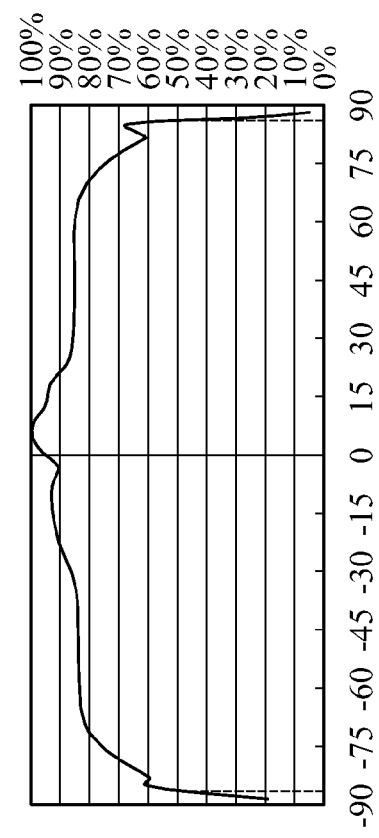
Figure 19D:
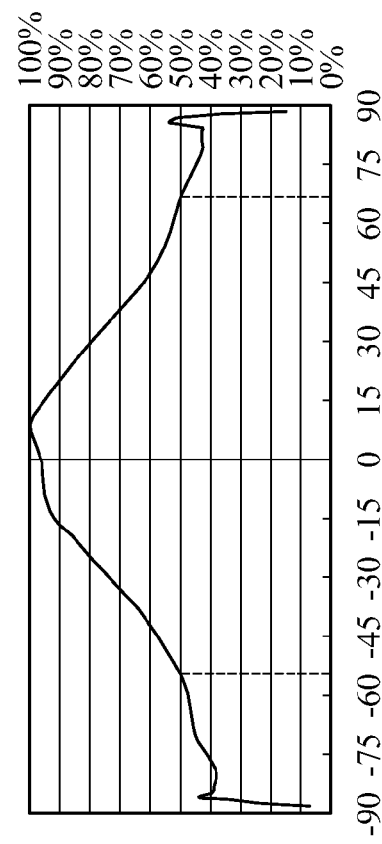
Figure 19C:
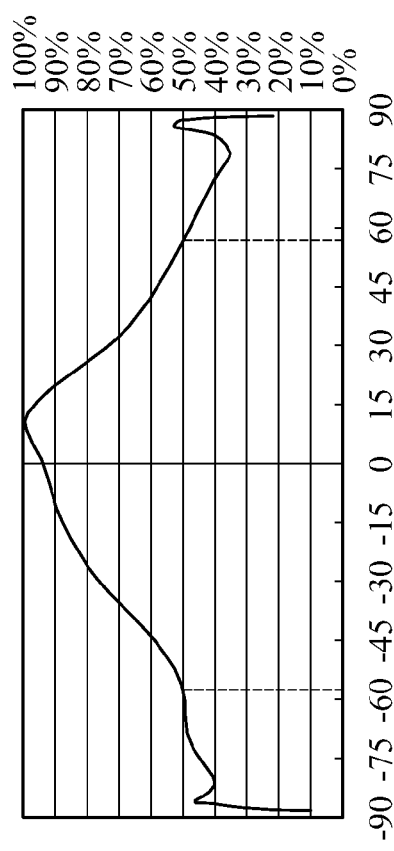
Figure 20B:
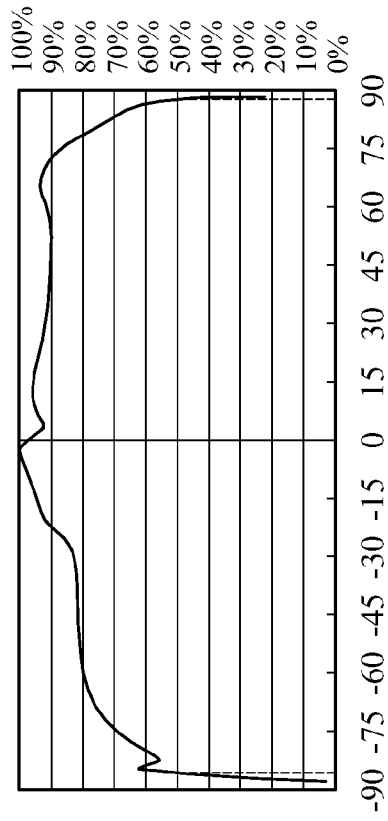
FIG. 20A to FIG. 20D are graphs of luminance with different viewing angles of the display device when the angle between the first alignment direction and the first axis, the angle between the first alignment direction and the second axis, the angle between the second alignment direction and the first axis, and the angle between the second alignment direction and the second axis are all 50 degrees, according to the fifteenth embodiment of the disclosure.
Figure 20A:
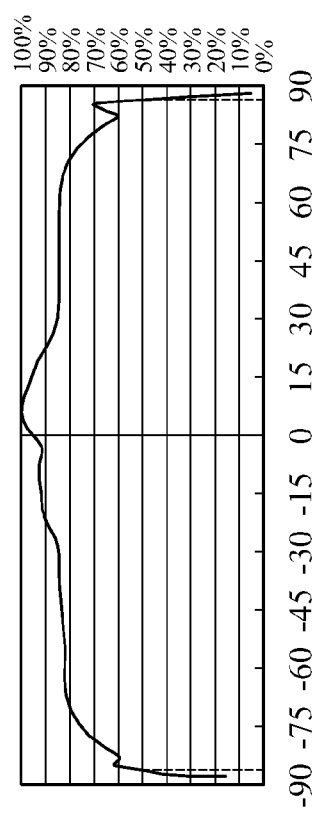
Figure 20D:
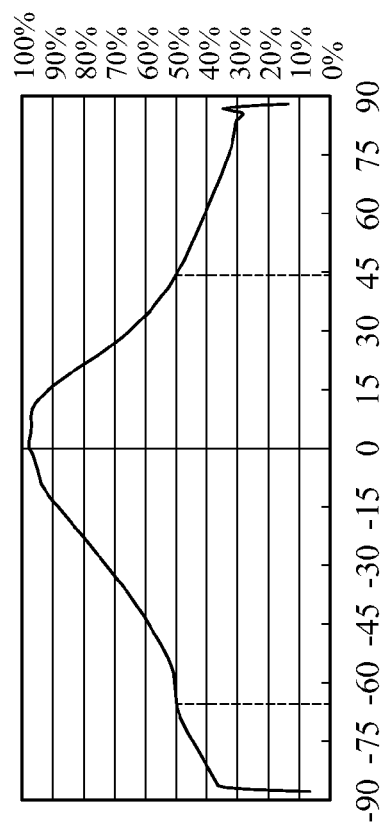
Figure 20C:
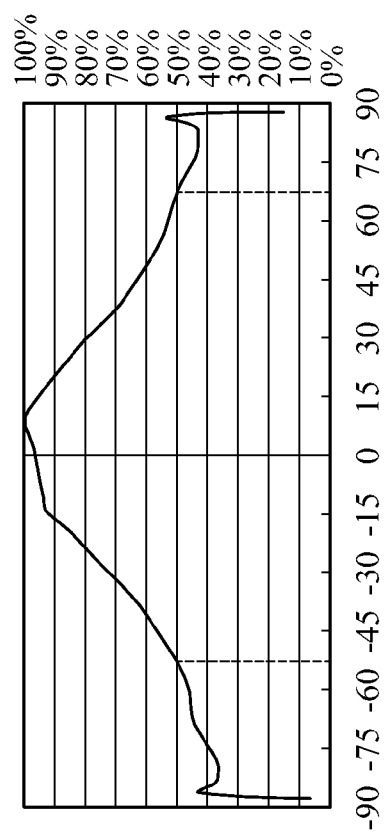
Figure 21B:
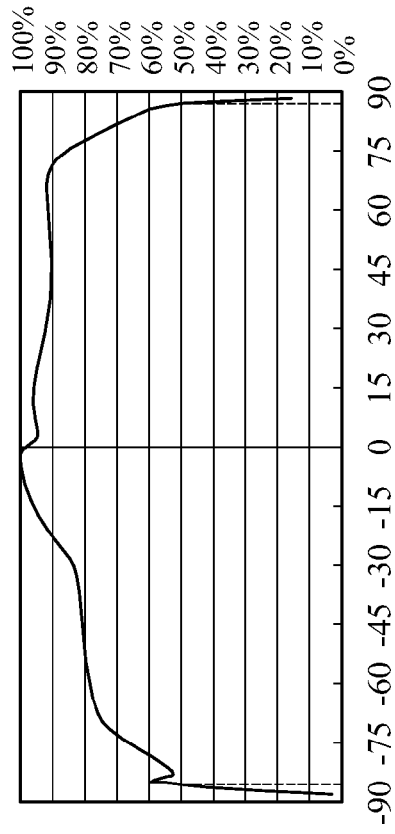
FIG. 21A to FIG. 21D are graphs of luminance with different viewing angles of the display device when the angle between the first alignment direction and the first axis, the angle between the first alignment direction and the second axis, the angle between the second alignment direction and the first axis, and the angle between the second alignment direction and the second axis are all 40 degrees, according to the sixteenth embodiment of the disclosure.
Figure 21A:
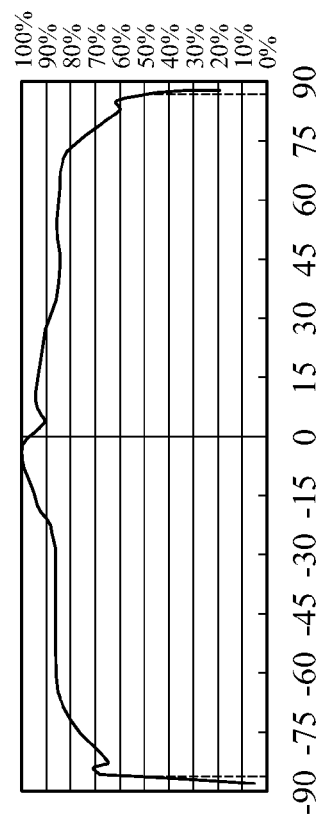
Figure 21D:
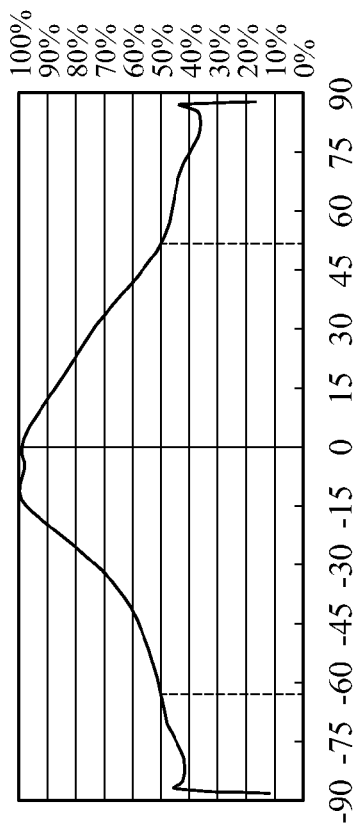
Figure 21C:
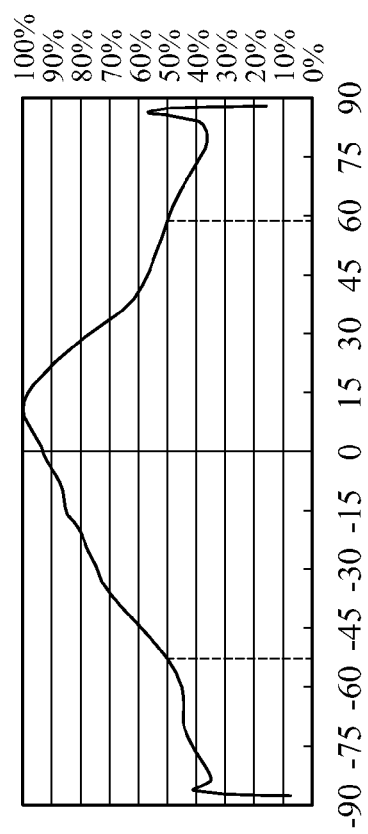

The foregoing display panel 100 curves about a single axis as the axis of curvature, but the disclosure is not limited thereto. In other embodiments, the display panel 100 can curve around multiple axes as the axes of curvature. Referring to FIG. 17 and FIG. 18, FIG. 17 is an exploded view of the display device according to the fourteenth embodiment of the disclosure; FIG. 18 is a perspective view of the optical film of FIG. 17. The display device 10 of this embodiment comprises a flexible display panel 100, a light module 200 and an optical film 300.

The flexible display panel 100 has a first axis A1 and a second axis A2 perpendicular to the first axis A1. The flexible display panel 100 curves about both the first axis A1 and the second axis A2 as axes of curvature. The light module 200 is located on one side of the flexible display panel 100.

The optical film 300 is between the flexible display panel 100 and the light module 200 and comprises a substrate 310 and a plurality of pyramidal microstructures 340.

The substrate 310 curves about both the first axis A1 and the second axis A2 as axes of curvature. The substrate 310 has a first side 311 and a second side 312 opposite to each other. The first side 311 faces the light module 200 while the second side 312 faces the flexible display panel 100.

The pyramidal microstructures 340 are located on the first side 311 of the substrate 310. These pyramidal microstructures 340 are arranged in an array along both a first alignment direction and a second assignment direction intersecting with the first alignment direction. Specifically, the angle between the first alignment direction and the first axis A1, the angle between the first alignment direction and the second axis A2, the angle between the second alignment direction and the first axis A1, and the angle between the second alignment direction and the second axis A2 are all greater than or equal to 40 degrees and less than or equal to 50 degrees. In this embodiment, every angle is 45 degrees but they are not limited thereto.

Specifically, each of the pyramidal microstructures 340 is a square based pyramid. Each of the pyramidal microstructures 340 has two opposite lateral sides 321 connected to the first side 311 of the substrate 310. The angle between the two opposite lateral sides 321 is greater than or equal to 90 degrees and less than or equal to 120 degrees. Moreover, the width of each pyramidal microstructure 340 is greater than or equal to 10 μm and less than or equal to 100 μm.

In this embodiment, the substrate 310 curves about the first axis A1 and the second axis A2 as axes of curvature, but the disclosure is not limited thereto. In other embodiments, the substrate 310 can be a flat plate.

Furthermore, at least one of the pyramidal microstructures 340 has a curved surface 323, and the angle between the curved surface 323 and the first alignment direction or the second alignment direction is greater than 0 degree and less than or equal to 30 degrees.

The optical effects of the display device 10 are illustrated as follows. Firstly, a first direction D1 perpendicular to the first axis L1 is provided, a second direction D2 parallel to the first axis L1 is provided, a third direction D3 forming a 45 degree angle with the first direction D1 is provided, and a fourth direction D4 forming a 45 degree angle with the second direction D2 is provided. The third direction D3 is perpendicular to the fourth direction D4. Then, due to the relationship between the flexible display panel 100 and the pyramidal microstructures 340, the display device 10 meet the following conditions: 1. Both the angle of full width at half maximum of the display device along the first direction (FWHM1) and the angle of full width at half maximum of the display device along the second direction (FWHM2) are greater than 140 degrees. 2. Both the angle of full width at half maximum of the display device along the third direction (FWHM3) and the angle of full width at half maximum of the display device along the fourth direction (FWHM4) are less than 125 degrees. 3. The difference between FWHM1 and FWHM3 , the difference between FWHM1 and FWHM4 , the difference between FWHM2 and FWHM3 , and the difference between FWHM2 and FWHM4 are all greater than 40 degrees. When these conditions are met, the uniform of the luminance and the saturation of the display device 10 is improved.

Referring to FIG. 19A to FIG. 21D, FIG. 19A to FIG. 19D are graphs of luminance with different viewing angles of FIG. 17 when the angle between the first alignment direction and the first axis, the angle between the first alignment direction and the second axis, the angle between the second alignment direction and the first axis, and the angle between the second alignment direction and the second axis are all 45 degrees; FIG. 20A to FIG. 20D are graphs of luminance with different viewing angles of the display device when the angle between the first alignment direction and the first axis, the angle between the first alignment direction and the second axis, the angle between the second alignment direction and the first axis, and the angle between the second alignment direction and the second axis are all 50 degrees, according to the fifteenth embodiment of the disclosure; FIG. 21A to FIG. 21D are graphs of luminance with different viewing angles of the display device when the angle between the first alignment direction and the first axis, the angle between the first alignment direction and the second axis, the angle between the second alignment direction and the first axis, and the angle between the second alignment direction and the second axis are all 40 degrees, according to the sixteenth embodiment of the disclosure.

As seen in FIG. 19A to FIG. 19D, in this embodiment, the angle between the first alignment direction and the first axis A1, the angle between the first alignment direction and the second axis A2, the angle between the second alignment direction and the first axis A1, and the angle between the second alignment direction and the second axis A2 are all 45 degrees. Thereby, the measurement result shows that both the angle of full width at half maximum of the display device along the first direction(FWHM1) and the angle of full width at half maximum of the display device along the second direction (FWHM2) are 175 degrees (greater than 140 degrees), the angle of full width at half maximum of the display device along the third direction (FWHM3) is 110 degrees (less than 125 degrees) and the angle of full width at half maximum of the display device along the fourth direction (FWHM4) is 123 degrees (less than 125 degrees), and the difference between FWHM1 and FWHM3 is 65 degrees (greater than 40 degrees), the difference between FWHM1 and FWHM4 is 52 degrees (greater than 40 degrees), the difference between FWHM2 and FWHM3 is 65 degrees (greater than 40 degrees), and the difference between FWHM2 and FWHM4 is 52 degrees (greater than 40 degrees).

As seen in FIG. 20A to FIG. 20D, in this embodiment, the angle between the first alignment direction and the first axis A1, the angle between the first alignment direction and the second axis A2, the angle between the second alignment direction and the first axis A1, and the angle between the second alignment direction and the second axis A2 are all 50 degrees. Thereby, the measurement result shows that both the angle of full width at half maximum of the display device along the first direction (FWHM1) and the angle of full width at half maximum of the display device along the second direction (FWHM2) are 175 degrees (greater than 140 degrees), the angle of full width at half maximum of the display device along the third direction (FWHM3) is 110 degrees (less than 125 degrees) and the angle of full width at half maximum of the display device along the fourth direction (FWHM4) is 115 degrees (less than 125 degrees), and the difference between FWHM1 and FWHM3 is 65 degrees (greater than 40 degrees), the difference between FWHM1 and FWHM4 is 60 degrees (greater than 40 degrees), the difference between FWHM2 and FWHM3 is 65 degrees (greater than 40 degrees), and the difference between FWHM2 and FWHM4 is 60 degrees (greater than 40 degrees).

As seen in FIG. 21A to FIG. 21D, in this embodiment, the angle between the first alignment direction and the first axis A1, the angle between the first alignment direction and the second axis A2, the angle between the second alignment direction and the first axis A1, and the angle between the second alignment direction and the second axis A2 are all 40 degrees. Thereby, the measurement result shows that both the angle of full width at half maximum of the display device along the first direction (FWHM1) and the angle of full width at half maximum of the display device along the second direction (FWHM2) are 175 degrees (greater than 140 degrees), the angle of full width at half maximum of the display device along the third direction (FWHM3) is 110 degrees (less than 125 degrees) and the angle of full width at half maximum of the display device along the fourth direction (FWHM4) is 115 degrees (less than 125 degrees), and the difference between FWHM1 and FWHM3 is 65 degrees (greater than 40 degrees), the difference between FWHM1 and FWHM4 is 60 degrees (greater than 40 degrees), the difference between FWHM2 and FWHM3 is 65 degrees (greater than 40 degrees), and the difference between FWHM2 and FWHM4 is 60 degrees (greater than 40 degrees).

Figure 22:
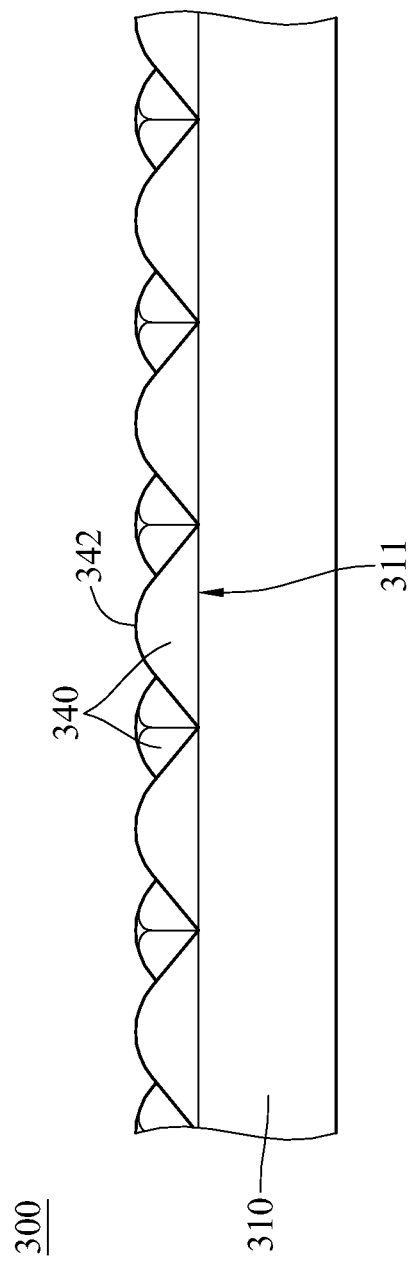
FIG. 22 is a partial planar view of the optical film according to the seventeenth embodiment of the disclosure.

FIG. 22 is a partial planar view of the optical film according to the seventeenth embodiment of the disclosure. As seen in FIG. 22, in this embodiment, an end 322 of each of the pyramidal microstructures 340, away from the substrate 310, has a rounded structure, and the radius of curvature of the rounded structure is greater than or equal to 5 μm and less than or equal to 80 μm.

Figure 23:
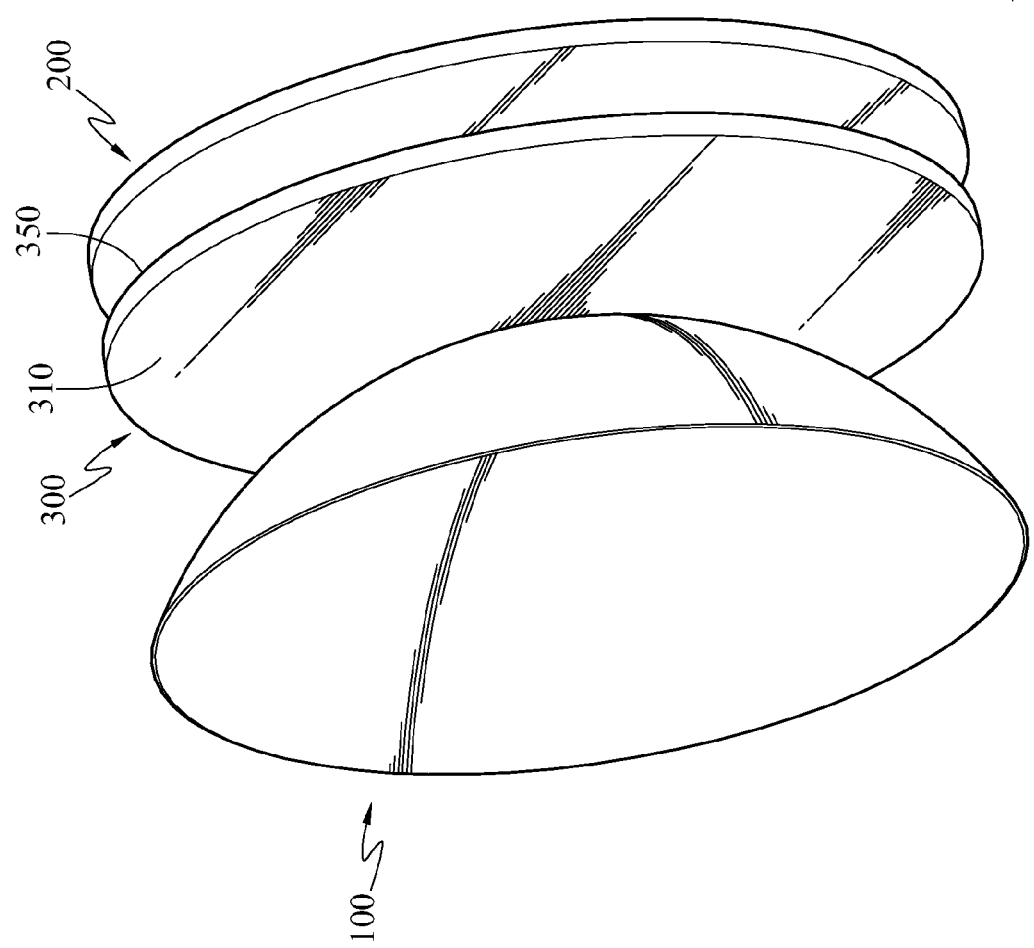
FIG. 23 is an exploded view of the display device according to the eighteenth embodiment of the disclosure.
Figure 24:
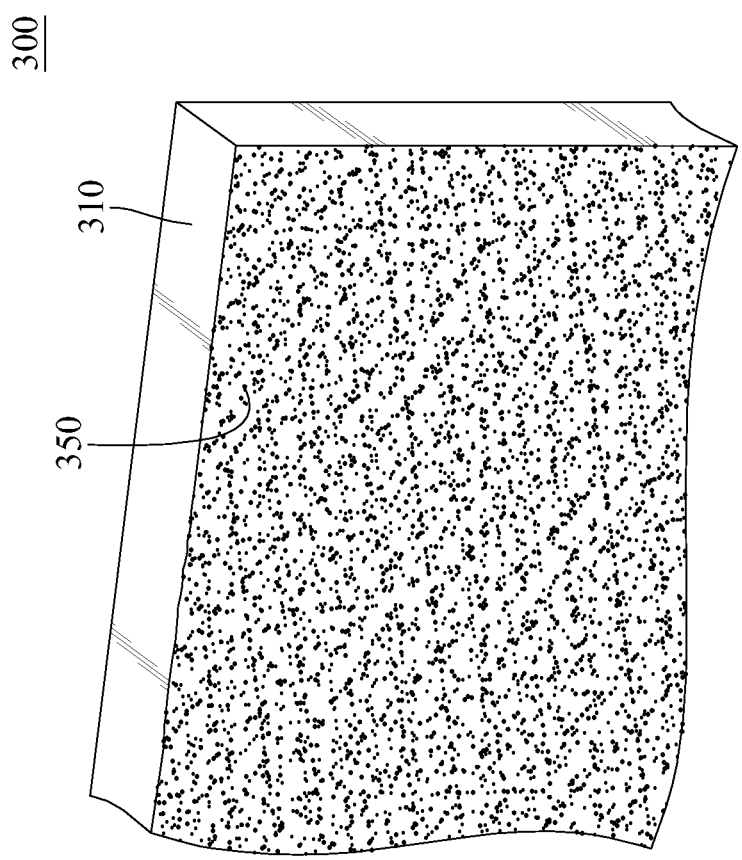
FIG. 24 is a partially perspective view of the optical film of FIG. 23.

FIG. 23 is an exploded view of the display device according to the eighteenth embodiment of the disclosure; FIG. 24 is a partially perspective view of the optical film of FIG. 23. As seen in FIG. 23 and FIG. 24, in this embodiment, a display device 10 comprises a flexible display panel 100, a light module 200 and an optical film 300. The flexible display panel 100 curves as a spherical shape. In this embodiment, the spherical shape is a rounded-ball shape, but it is not limited thereto. In other embodiments, the spherical shape can be an oval-ball shaped. The light module 200 is on one side of the flexible display panel 100. In this embodiment, the convex part of the flexible display panel 100 faces the light module 200, but it is not limited thereto. In other embodiments, the concave part of the flexible display panel 100 may face the light module 200.

The optical film 300, located between the flexible display panel 100 and the light module 200, comprises a substrate 310 having a plurality of microcavities 350. The maximum apertures of the microcavities 350 are less than 1 μm, but it is not limited thereto. In other embodiments, the apertures of the microcavities 350 being 10 μm is wide enough to enable the light transmittance of the substrate 310 to range from 5% to 50%, thereby making the angles of full width at half maximum of the display device 10 along each direction are greater than 140 degrees. Also, the material of the substrate 310 is selected from a group consisting of the combination of PMMA, MS, PC, PET, PP, PE, COC, COP and a combination thereof.

In this and some other embodiments, the porosity of the substrate 310 is greater than or equal to 30% and less than or equal to 80%.

In this and some other embodiments, the optical film 300 further comprises a plurality of reinforcing particles located in the substrate and the material of the reinforcing particles is different from the material of the substrate 310. In this embodiment, the material of the reinforcing particles are selected from a group consisting of PMMA, MS, PC, PET, PP, PE SiO2, Mg(OH)2, CaCo3, BaSo4, AL2O3, TiO2 and a combination thereof.

The optical effects of the display device 10 are illustrated as follows. Through each microcavity 350 of the optical film 300, the display device 10 meet the following conditions: 1. Both the angle of full width at half maximum of the display device along each direction are greater than 140 degrees. When these conditions are met, the uniform of the luminance and the saturation of the display device 10 is improved.

Figure 25:
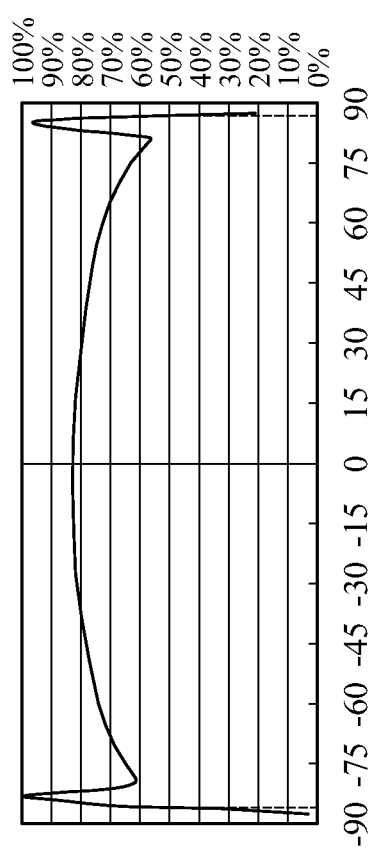
FIG. 25 is graph of luminance with every direction of FIG. 23.

FIG. 25 is graph of luminance with every direction of FIG. 23. As seen in FIG. 25, in this embodiment, the angles of full width at half maximum of the display device 10 along each direction are 175 degrees (greater than 140 degrees).

According to the embodiments illustrated above, via the angle relationship among the flexible display panel, the first strip microstructures and the second strip microstructures, the display device 10 curving about the first axis as the axis of curvature can meet the following conditions: 1. the angle of full width at half maximum of the display device 10 along the first direction (FWHM1) is greater than 140 degrees. 2. The angle of full width at half maximum of the display device 10 along the second direction (FWHM2) is less than 100 degrees. 3. The difference between FWHM1 and FWHM2 is greater than 50 degrees. When these conditions are satisfied, the uniform of the luminance and the saturation of the display device 10 is improved.

Furthermore, via the angle relationship among the flexible display panel and the axes of the first strip microstructures, the display device 10 curving about the first axis as the axis of curvature can meet the following conditions: 1. the angle of full width at half maximum of the display device 10 along the first direction (FWHM1) is greater than 140 degrees. 2. The angle of full width at half maximum of the display device 10 along the second direction (FWHM2) is less than 100 degrees. 3. The difference between FWHM1 and FWHM2 is greater than 50 degrees. When these conditions are met, the uniform of the luminance and the saturation of the display device 10 is improved.

Moreover, due to the angle relationship among the first axis and the second axis of the flexible display panel and the pyramidal microstructures, the display device 10 curving about the first axis and the second axis as the axes of curvature can meet the following conditions: 1. Both the angle of full width at half maximum of the display device along the first direction (FWHM1) and the angle of full width at half maximum of the display device along the second direction (FWHM2) are greater than 140 degrees. 2. Both the angle of full width at half maximum of the display device along the third direction (FWHM3) and the angle of full width at half maximum of the display device along the fourth direction (FWHM4) are less than 125 degrees. 3. The difference between FWHM1 and FWHM3 , the difference between FWHM1 and FWHM4 , the difference between FWHM2 and FWHM3 , and the difference between FWHM2 and FWHM4 are all greater than 40 degrees. When these conditions are met, the uniform of the luminance and the saturation of the display device 10 is improved.

Additionally, by the microcavities of the optical film and the spherical-shaped flexible display panel, the angles of full width at half maximum of the display device 10 along each direction are greater than 140 degrees.

What is claimed is:

1. A display device comprising;
a flexible display panel having a first axis and curving about the first axis as an axis of curvature, wherein a first direction perpendicular to the first axis is defined, a second direction parallel to the first axis is defined, the angle of full width at half maximum of the display device along the first direction (hereinafter FWHM1) is greater than 140 degrees, the angle of full width at half maximum of the display device along the second direction (hereinafter FWHM2) is less than 100 degrees, and the difference between FWHM1 and FWHM2 is greater than 50 degrees;
a light module located on one side of the flexible display panel; and
an optical film located between the flexible display panel and the light module, and the optical film comprising:
a substrate having a first side and a second side that are opposite to each other, wherein the first side faces the light module while the second side faces the flexible display panel; and
a plurality of first strip microstructures located on the first side of the substrate, wherein the first strip microstructures extend along a second axis;
wherein a first angle is formed between the first axis and the second axis, and the first angle is greater than or equal to minus 15 degrees and less than or equal to 15 degrees.

2. The display device according to claim 1, wherein the first angle is 0 degree.

3. The display device according to claim 1, wherein an end of each of the first strip microstructures, away from the substrate, has a rounded structure, and the radius of curvature of the rounded structure is greater than or equal to 5 μm and less than or equal to 80 μm.

4. The display device according to claim 1, wherein the width of the first strip microstructure is greater than or equal to 10 μm and less than or equal to 100 μm.

5. The display device according to claim 1, wherein at least one of the first strip microstructure has a curved surface, and the angle between the curved surface and the second axis is greater than 0 degree and less than or equal to 30 degrees.

6. The display device according to claim 1, wherein each of the first strip microstructures has two opposite lateral sides that are connected to the first side of the substrate, and are planes or arc surfaces.

7. The display device according to claim 1, wherein the surface of at least one of the first strip microstructures has a plurality of sub-microstructures.

8. A display device comprising;
a flexible display panel having a first axis and curving along the first axis as an axis of curvature;
a light module located on one side of the flexible display panel; and
an optical film located between the flexible display panel and the light module, the optical film comprising:
a substrate having a first side and a second side that are opposite to each other, wherein the first side faces the light module while the second side faces the flexible display panel;
a plurality of first strip microstructures located on the first side of the substrate, and wherein the plurality of first strip microstructures extend along a second axis; and
a plurality of second strip microstructures located on the second side of the substrate;
wherein a first angle is formed between the first axis and the second axis, and the first angle is greater than or equal to minus 20 degrees and less than or equal to 20 degrees.

9. The display device according to claim 8, wherein the substrate curves about the first axis as the axis of curvature, the second strip microstructures curve about a third axis as the axis of curvature, a second angle is formed between the first axis and the third axis, and the second angle is greater than or equal to minus 20 degrees and less than or equal to 20 degrees.

10. The display device according to claim 8, wherein the substrate is a plate, the second strip microstructures extend along the third axis, a second angle is formed between the first axis and the third axis, and the second angle is greater than or equal to 70 degrees and less than or equal to 110 degrees.

11. The display device according to claim 8, wherein the width of the second strip microstructure is greater than or equal to 10 μm and less than or equal to 100 μm.

12. The display device according to claim 8, wherein each of the second strip microstructures has two opposite lateral sides connected to the second side of the substrate, and the two opposite lateral sides are planes or arc surfaces.

13. The display device according to claim 8, wherein the surface of at least one of the second strip microstructures has a plurality of sub-microstructures.

14. The display device according to claim 8, wherein a first direction perpendicular to the first axis is defined, a second direction parallel to the first axis is defined, the angle of full width at half maximum of the display device along the first direction (hereinafter FWHM1) is greater than 140 degrees, the angle of full width at half maximum of the display device along the second direction (hereinafter FWHM2) is less than 100 degrees, and the difference between FWHM1 and FWHM2 is greater than 50 degrees.

15. A display device comprising;
a flexible display panel having a first axis and curving about the first axis as an axis of curvature;
a light module located on one side of the flexible display panel; and
an optical film located between the flexible display panel and the light module, the optical film comprising:
a substrate having a first side and a second side that are opposite to each other, wherein the first side faces the light module while the second side faces the flexible display panel; and
a plurality of first strip microstructure located on the first side of the substrate, wherein the plurality of first strip microstructures extend along a second axis;
wherein a first direction perpendicular to the first axis is defined, a second direction parallel to the first axis is defined, the angle of full width at half maximum of the display device along the first direction (hereinafter FWHM1) is greater than 140 degrees, the angle of full width at half maximum of the display device along the second direction (hereinafter FWHM2) is less than 100 degrees, and the difference between FWHM1 and FWHM2 is greater than 50 degrees.

16. The display device according to claim 15, wherein the substrate curves about the first axis as the axis of curvature, the second strip microstructures extends along a second axis, and the second axis is parallel to the first axis.

17. The display device according to claim 16, further comprising a plurality of second strip microstructures located on the second side of the substrate, the second strip microstructures curve about a third axis as the axis of curvature, and the third axis is parallel to the first axis.

18. The display device according to claim 15, wherein the substrate is a plate, the first strip microstructures extend along a second axis, and the second axis is parallel to the first axis.

19. The display device according to claim 18, further comprising a plurality of second strip microstructures located on the second side of the substrate, the second strip microstructures extend along a third axis, and the first axis is perpendicular to the third axis.

20. A display device comprising;
a flexible display panel having a first axis and a second axis perpendicular to the first axis, wherein the flexible display panel curves along both the first axis and the second axis as the axes of curvature;
a light module located on one side of the flexible display panel; and
an optical film located between the flexible display panel and the light module, the optical film comprising:
a substrate having a first side and a second side that are opposite to each other, wherein the first side faces the light module while the second side faces the flexible display panel; and
a plurality of pyramidal microstructures located on the first side of the substrate, wherein the pyramidal microstructures are arranged in an array along a first alignment direction and a second assignment direction intersecting with the first alignment direction;
wherein the angle between the first alignment direction and the first axis, the angle between the first alignment direction and the second axis, the angle between the second alignment direction and the first axis, and the angle between the second alignment direction and the second axis are all greater than or equal to 40 degrees and less than or equal to 50 degrees.

21. The display device according to claim 20, wherein the angle between the first alignment direction and the first axis, the angle between the first alignment direction and the second axis, the angle between the second alignment direction and the first axis, and the angle between the second alignment direction and the second axis are all 45 degrees.

22. The display device according to claim 20, wherein the substrate curves along both the first axis and the second axis as the axes of curvature.

23. The display device according to claim 20, wherein an end of each of the pyramidal microstructures, away from the substrate, has a rounded structure, and the radius of curvature of the rounded structure is greater than or equal to 5 μm and less than or equal to 80 μm.

24. The display device according to claim 20, wherein the width of each of the pyramidal microstructures is greater than or equal to 10 μm and less than or equal to 100 μm.

25. The display device according to claim 20, wherein each of the pyramidal microstructures has two opposite lateral sides connected to the first side of the substrate, and the angle between the two opposite lateral sides is greater than or equal to 90 degrees and less than or equal to 120 degrees.

26. The display device according to claim 20, wherein at least one of the pyramidal microstructures has a curved surface, the angle between the curved surface and the first alignment direction or the angle between the curved surface and the second alignment direction is greater than 0 degree and less than or equal to 30 degrees.

27. The display device according to claim 20, wherein a first direction perpendicular to the first axis is defined, a second direction parallel to the first axis is defined, a third direction forming a 45 degree angle between itself and the first direction is defined, a fourth direction forming a 45 degree angle between itself and the second direction is defined, the fourth direction is perpendicular to the third direction, both the angle of full width at half maximum of the display device along the first direction (hereinafter FWHM1) and the angle of full width at half maximum of the display device along the second direction (hereinafter FWHM2) are greater than 140 degrees, both the angle of full width at half maximum of the display device along the third direction (hereinafter FWHM3) and the angle of full width at half maximum of the display device along the fourth direction (hereinafter FWHM4) are less than 125 degrees, and the difference between FWHM1 and FWHM3, the difference between FWHM1 and FWHM4, the difference between FWHM2 and FWHM3, and the difference between FWHM2 and FWHM4 are all greater than 40 degrees.

28. A display device comprising;
a flexible display panel having a first axis and a second axis perpendicular to the first axis, wherein the flexible display panel curves along both the first axis and the second axis as the axes of curvature;
a light module located on one side of the flexible display panel; and
an optical film located between the flexible display panel and the light module, the optical film comprising:
a substrate having a first side and a second side that are opposite to each other, wherein the first side faces the light module while the second side faces the flexible display panel; and
a plurality of pyramidal microstructures located on the second side of the substrate and arranged in an array;
wherein a first direction perpendicular to the first axis is defined, a second direction parallel to the first axis is defined, a third direction forming a 45 degree angle between itself and the first direction is defined, a fourth direction forming a 45 degree angle between itself and the second direction is defined, the fourth direction is perpendicular to the third direction, both the angle of full width at half maximum of the display device along the first direction (hereinafter FWHM1) and the angle of full width at half maximum of the display device along the second direction (hereinafter FWHM2) are greater than 140 degrees, both the angle of full width at half maximum of the display device along the third direction (hereinafter FWHM3) and the angle of full width at half maximum of the display device along the fourth direction (hereinafter FWHM4) are less than 125 degrees, and the difference between FWHM1 and FWHM3, the difference between FWHM1 and FWHM4, the difference between FWHM2 and FWHM3, and the difference between FWHM2 and FWHM4 are all greater than 40 degrees.

29. A display device comprising:
a flexible display panel curving as a spherical shape;

a light module located on one side of the flexible display panel; and an optical film located between the flexible display panel and the light module, wherein the optical film comprises a substrate having a plurality of microcavities, and the light transmittance of the substrate ranges from 5% to 50%.

30. The display device according to claim 29, wherein the apertures of the microcavities are less than 10 μm, and the porosity of the substrate is greater than or equal to 30% and less than or equal to 80%.

31. The display device according to claim 29, wherein the optical film further comprises a plurality of reinforcing particles located in the substrate and the material of the reinforcing particles is different from the material of the substrate.

32. The display device according to claim 29, wherein the maximum apertures of the microcavities are less than 1 μm.

33. The display device according to claim 29, wherein the angles of full width at half maximum of the display device along any direction are all greater than 140 degrees.

34. A display device comprising:

a flexible display panel curving as a spherical shape;

a light module located on one side of the flexible display panel; and an optical film having a plurality of microcavities, wherein the angles of full width at half maximum of the display device along any direction are greater than 140 degrees.

* * * * *